United States Patent
Bae et al.

(10) Patent No.: US 11,512,693 B2
(45) Date of Patent: Nov. 29, 2022

(54) LINEAR COMPRESSOR

(71) Applicant: LG Electronics Inc., Seoul (KR)

(72) Inventors: Sangeun Bae, Seoul (KR); Sangmin Lee, Seoul (KR); Hyunsoo Kim, Seoul (KR); Dongkyun Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/214,368

(22) Filed: Mar. 26, 2021

(65) Prior Publication Data

US 2021/0396224 A1    Dec. 23, 2021

(30) Foreign Application Priority Data

Jun. 17, 2020  (KR) .................. 10-2020-0073806

(51) Int. Cl.
*F04B 35/04*  (2006.01)
*F04B 53/14*  (2006.01)
(Continued)

(52) U.S. Cl.
CPC .......... *F04B 53/14* (2013.01); *F04B 35/045* (2013.01); *F04B 39/0005* (2013.01); *F16F 1/125* (2013.01); *F16F 1/126* (2013.01)

(58) Field of Classification Search
CPC ... F16F 1/12; F16F 1/126; F16F 1/125; F04B 35/045; F04B 39/00; F04B 39/005; F04B 39/0016; F04B 39/0022; F04B 39/0005; F04B 53/001–004; F04B 53/14; F04B 53/145; F04B 53/147

(Continued)

(56) References Cited

U.S. PATENT DOCUMENTS 3,689,203 A * 9/1972 Vaughn .................. F25B 31/02
                                                            417/363
3,862,751 A * 1/1975 Schwaller ............... F16F 1/125
                                                            267/179

(Continued)

FOREIGN PATENT DOCUMENTS

CN      1548727      11/2004
CN    103629075       3/2014

(Continued)

OTHER PUBLICATIONS

KR Office Action in Korean Appln. No. 10-2020-0073806, dated Apr. 22, 2021, 19 pages (with English translation).

(Continued)

*Primary Examiner* — Thomas Fink
(74) *Attorney, Agent, or Firm* — Fish & Richardson P.C.

(57) ABSTRACT

A linear compressor includes a shell, a motor in the shell, a mover coupled to the motor and configured to perform a reciprocating motion in an axial direction, a cylinder disposed in the shell, a piston coupled to the mover and configured to reciprocate in the cylinder, a spring that supports the piston in the axial direction, and a spring cap inserted into an end portion of the spring. The spring cap defines a space portion that is defined inside the spring cap and has a volume separate from the inner space of the shell, and a passage portion that extends through an axial side surface of the spring cap and is configured to provide communication between the space portion and the inner space of the shell.

19 Claims, 14 Drawing Sheets

(51) Int. Cl.
*F04B 39/00* (2006.01)
*F16F 1/12* (2006.01)

(58) Field of Classification Search
USPC .............................. 267/170, 174, 178, 179
See application file for complete search history.

(56) References Cited

U.S. PATENT DOCUMENTS

| | | | | |
|---|---|---|---|---|
| 5,118,262 | A * | 6/1992 | Kuo | F04B 39/0033 |
| | | | | 417/363 |
| 6,004,113 | A * | 12/1999 | Vay | F04B 39/127 |
| | | | | 417/363 |
| 6,375,171 | B1 * | 4/2002 | Zimmermann | F16F 15/067 |
| | | | | 267/179 |
| 6,390,788 | B1 * | 5/2002 | Tack | F04B 39/0072 |
| | | | | 181/403 |
| 6,485,271 | B1 * | 11/2002 | Tack | F04B 39/0044 |
| | | | | 417/363 |
| 6,716,001 | B2 * | 4/2004 | Kim | F04B 39/0246 |
| | | | | 417/424.2 |
| 7,478,790 | B2 * | 1/2009 | Yun | F04B 39/0044 |
| | | | | 248/677 |
| 7,722,335 | B2 * | 5/2010 | Kim | F04B 39/0044 |
| | | | | 417/363 |
| 10,371,131 | B2 * | 8/2019 | Bae | F04B 39/10 |
| 2004/0247457 | A1 | 12/2004 | Kim et al. | |
| 2006/0210411 | A1 * | 9/2006 | Hyeon | F04B 35/045 |
| | | | | 417/417 |
| 2006/0251529 | A1 * | 11/2006 | Kim | F04B 35/045 |
| | | | | 417/417 |
| 2009/0110585 | A1 * | 4/2009 | Outzen | F04B 39/127 |
| | | | | 418/179 |
| 2015/0377228 | A1 | 12/2015 | Ki et al. | |
| 2016/0017872 | A1 * | 1/2016 | Kim | F04B 35/04 |
| | | | | 417/415 |
| 2017/0321692 | A1 * | 11/2017 | Bae | F04B 35/045 |
| 2019/0178538 | A1 * | 6/2019 | Lim | F16F 1/125 |
| 2019/0226466 | A1 * | 7/2019 | Lee | F04B 39/123 |
| 2020/0318621 | A1 * | 10/2020 | Kim | F04B 53/16 |
| 2021/0140439 | A1 * | 5/2021 | Da Silva Castro | F04D 29/403 |

FOREIGN PATENT DOCUMENTS

| | | |
|---|---|---|
| CN | 105201775 | 12/2015 |
| CN | 106150974 | 11/2016 |
| KR | 1020160024217 | 3/2016 |
| KR | 1020 170124899 | 11/2017 |
| KR | 20180074092 | 7/2018 |

OTHER PUBLICATIONS

Extended European Search Report in European Appln. No. 21164769.8, dated Sep. 1, 2021, 26 pages.
Notice of Allowance in Korean Appln. No. 10-2022-0003548, dated Feb. 22, 2022, 5 pages (with English translation).

* cited by examiner

V-V

V'-V'

V"-V"

VI-VI

VI'-VI'

VI"-VI"

LINEAR COMPRESSOR

CROSS-REFERENCE TO RELATED APPLICATION

Pursuant to 35 U.S.C. § 119(a), this application claims the benefit of the earlier filing date and the right of priority to Korean Patent Application No. 10-2020-0073806, filed on Jun. 17, 2020, the contents of which are incorporated by reference herein in their entirety.

TECHNICAL FIELD

The present disclosure relates to a linear compressor, and more particularly, a silencer.

BACKGROUND

A linear compressor can include a linear motor installed inside a sealed shell, and a piston connected to the linear motor. The linear compressor can perform suctioning, compressing, and discharging refrigerant while the piston is linearly reciprocating inside a cylinder.

Like other compressors, a linear compressor may generate noise including vibrational noise during operation of the compressor. The noise may be transmitted outwardly of the shell and lead to an increase of noise of products such as refrigerators including linear compressors therein.

In some cases, the linear compressor may include elements to suppress or reduce noise of the compressor. For example, a suction muffler may be installed in an inner space of a shell to reduce suction noise, and a discharge cover may be installed in an inner space of a shell to reduce discharge noise.

However, in some cases, despite the installation of the suction muffler or the discharge cover, some noise may not be canceled. For example, there are limits in effectively attenuating noise in 800 Hz band (see FIG. 10).

In some cases, a silencer may be additionally installed inside the shell. However, the silencer may increase material costs as the number of separate components as well as assemblers increases, and therefore, the overall manufacturing cost of the compressor may be increased.

In some cases, when a separate silencer is installed inside the shell, an internal volume of the shell may be increased, and therefore, an overall size or weight of the compressor may be increased.

In some cases, silencers of various standards may be installed in order to offset noise in various bands generated inside the shell.

SUMMARY

An aspect of the present disclosure is to provide a linear compressor capable of effectively canceling noise generated inside a shell.

Another aspect of the present disclosure is to provide a linear compressor capable of effectively canceling noise generated inside the shell by using existing members without additionally installing a silencer inside the shell.

Further, another aspect of the present disclosure is to provide a linear compressor capable of effectively canceling noise in various frequency bands generated inside a shell.

According to one aspect of the subject matter described in this application, a linear compressor includes a shell that defines an inner space therein, a motor that is disposed in the inner space of the shell and includes a mover configured to perform a reciprocating motion in an axial direction, a cylinder disposed in the inner space of the shell, a piston coupled to the mover of the motor and configured to reciprocate in the cylinder, a spring that supports the piston in the axial direction, and a spring cap that is inserted into and supports an end portion of the spring. The spring cap defines a space portion that is defined inside the spring cap and has a volume separate from the inner space of the shell, and a passage portion that extends through an axial side surface of the spring cap and is configured to provide communication between the space portion and the inner space of the shell.

Implementations according to this aspect can include one or more of the following features. For example, the linear compressor can further include a spring supporter coupled to the piston or the mover of the motor and configured to move together with the piston or the mover of the motor, where the spring supporter defines a cap support hole that receives the spring cap, and the spring cap passes through the cap support hole. In some examples, the spring cap can include a first cap inserted into a first side of the cap support hole, and a second cap inserted into a second side of the cap support hole opposite to the first side in the axial direction, where the first cap and the second cap are in communication with each other through the cap support hole and define the space portion inside the first cap and the second cap.

In some implementations, the spring supporter can be configured to move together with the piston or the mover of the motor and define a cap support hole that receives the spring cap, where an axial length of the space portion is greater than an axial length of the cap support hole of the spring supporter. In some implementations, the spring cap includes a first cap that is inserted into a first side of the cap support hole and defines a first space portion therein, and a second cap that is inserted into a second side of the cap support hole opposite to the first side in the axial direction, the second cap defining a second space portion therein. In some implementations, a volume of the first space portion can be equal to a volume of the second space portion. In some implementations, the volume of the first space portion can be different from the volume of the second space portion.

In some implementations, the spring cap includes a first cap that is inserted into a first side of the cap support hole, and a second cap that is inserted into a second side of the cap support hole opposite to the first side in the axial direction, where one of the first cap or the second cap has a first axial side surface that is blocked, and another of the first cap or the second cap has a second axial side surface that is at least partially opened and defines the passage portion.

In some implementations, the spring cap includes a first cap that is inserted into a first side of the cap support hole, and a second cap that is inserted into a second side of the cap support hole opposite to the first side in the axial direction, where the passage portion includes a first passage portion defined at one surface of the first cap, and a second passage portion defined at one surface of the second cap.

In some examples, the first passage portion can be defined at a first side of the spring cap, and the second passage portion can be defined at a second side of the spring cap opposite to the first side in the axial direction. A cross-sectional area of the first passage portion can be different from a cross-sectional area of the second passage portion, or an axial length of the first passage portion can be different from an axial length of the second passage portion.

In some implementations, the passage portion can include a first passage portion that is defined at a first side of the spring cap and extends along a first axial line, and a second passage portion that is defined at a second side of the spring cap opposite to the first side in the axial direction, the second passage portion extending along a second axial line different from the first axial line. In some implementations, the passage portion extends from one surface of the spring cap in the axial direction.

In some implementations, the spring cap can be one of a plurality of spring caps that are arranged in a circumferential direction, where each of the plurality of spring caps defines a space portion and a passage portion. In some examples, shapes of the space portions are identical to one another, and shapes of the passage portions are identical to one another. In some examples, a shape of at least one of the space portions is different from a shape of another of the space portions, and a shape of at least one of the passage portions can be different from a shape of another of the passage portions.

In some implementations, the first cap can be coupled to a first axial side surface of the spring supporter, and the second cap can be coupled to a second axial side surface of the spring supporter. The first cap can include a first hole insertion portion inserted from a first side surface of the spring supporter into a first side of the cap support hole, a first cap support portion that has a flange shape extending from an outer circumferential surface of the first hole insertion portion and is supported by the first side surface of the spring supporter in the axial direction, and a first spring insertion portion that extends from the first cap support portion away from the first hole insertion portion. The second cap can include a second hole insertion portion inserted from a second side surface of the spring supporter into a second side of the cap support hole, a second cap support portion that has a flange shape extending from an outer circumferential surface of the second hole insertion portion and is supported by the second side surface of the spring supporter in the axial direction, and a second spring insertion portion that extends from the second cap support portion away from the second hole insertion portion. An end portion of the first hole insertion portion can face and be in communication with an end portion of the second hole insertion portion to thereby define the space portion inside the first cap and the second cap. An axial side surface of the first spring insertion portion or an axial side surface of the second spring insertion portion can be at least partially opened and define the passage portion.

In some implementations, the first cap includes a hole penetrating portion that is inserted from a first side surface of the spring supporter into the cap support hole and penetrates the cap support hole in the axial direction, a first cap support portion that has a flange shape extending from an outer circumferential surface of the hole penetrating portion and is supported by the first side surface of the spring supporter in the axial direction, and a first spring insertion portion that extends from the first cap support portion away from the hole penetrating portion. The second cap can include a cap coupling portion disposed at a second side surface of the spring supporter and coupled to a part of the hole penetrating portion outside the cap support hole, a second cap support portion that has a flange shape extending from an outer circumferential surface of the cap coupling portion and is supported by the second side surface of the spring supporter in the axial direction, and a second spring insertion portion that extends from the cap coupling portion away from the first spring insertion portion.

In some implementations, the first cap can be coupled to a first axial side surface of the spring supporter and include a first spring insertion portion that extends in the axial direction. The second cap can be coupled to a second axial side surface of the spring supporter and include a second spring insertion portion that extends in the axial direction. An inner diameter of at least one of the first spring insertion portion or the second spring insertion portion can be constant along the axial direction.

In some implementations, a cross-sectional area of at least one of the first spring insertion portion or the second spring insertion portion can decrease as the at least one of the first spring insertion portion or the second spring insertion portion extends away from the spring supporter along the axial direction. In some implementations, the spring cap can pass through opposite axial side surfaces of the spring supporter and be coupled to the spring supporter, and an axial side surface of the spring cap can be at least partially opened and defines the passage portion.

In some implementations, the linear compressor can further include a stator cover and a rear cover that are disposed at one side of the motor and support opposite ends of the spring, respectively, where the spring cap is disposed at the stator cover or the rear cover. In some implementations, the spring can include a front spring and a rear spring that are arranged along the axial direction, where the spring cap is disposed between the front spring and the rear spring and connects the front spring and the rear spring to each other.

DETAILED DESCRIPTION

Description will now be given in detail of a linear compressor according to exemplary implementations disclosed herein, with reference to the accompanying drawings.

The linear compressor is configured to perform an operation of suctioning and compressing a fluid and discharging the compressed fluid, and can be a component of a refrigeration cycle device. Hereinafter, the fluid is described as an example of refrigerant circulating through the refrigeration cycle. In some implementations, a reciprocating direction of a piston is defined as an axial direction, and an axial center of a shell is defined as corresponding to each of axial centers of a frame, a cylinder, the piston, and others. Further, a compressing direction of the piston is defined as a front, and a suctioning direction is defined as a rear.

Figure 1:
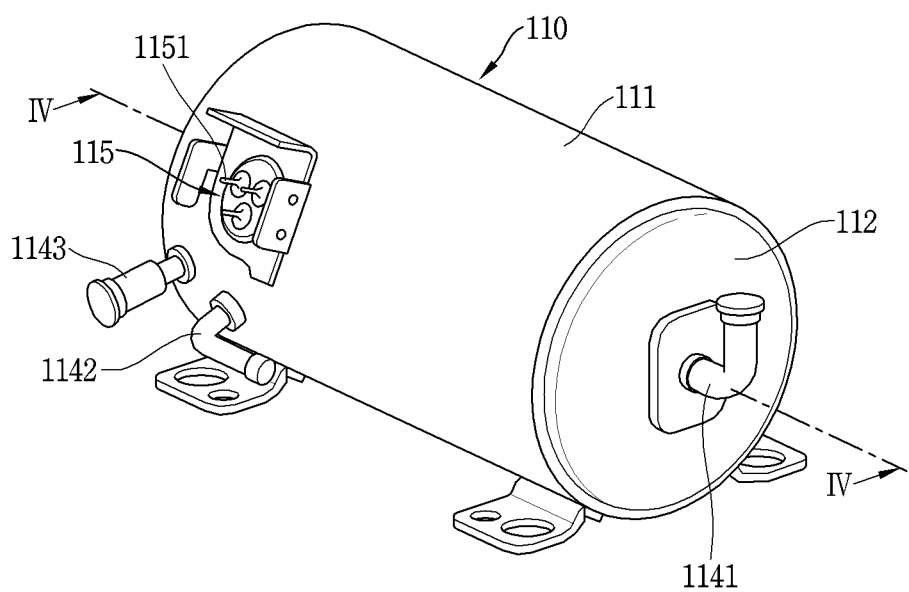
FIG. 1 is a perspective view illustrating an appearance of an example of a linear compressor viewed from a suction side.
Figure 2:
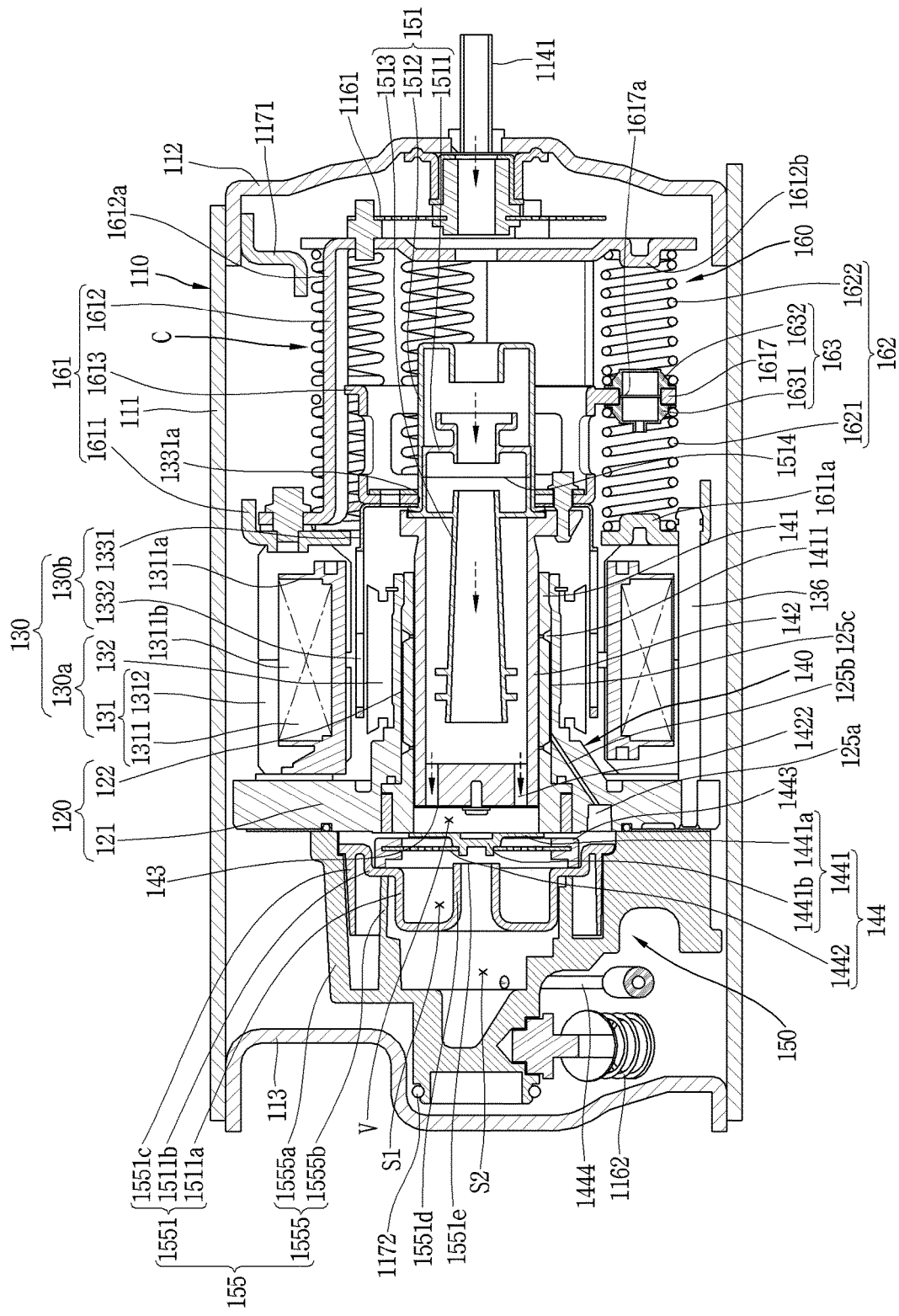
FIG. 2 is a cross-sectional view taken along a line IV-IV of FIG. 1, illustrating an inside of the linear compressor.

FIG. 1 is a perspective view illustrating an appearance of an example of a linear compressor viewed from a suction side, and FIG. 2 is a cross-sectional view taken along the line IV-IV of FIG. 1, illustrating an inside of the linear compressor.

Referring to FIGS. 1 and 2, the linear compressor includes a compressor body C in which a piston 142 provided inside a shell 110 and coupled to a mover 130b of a linear motor performs suctioning, compressing, and discharging refrigerant while reciprocating inside a cylinder 141.

The shell 110 can include a cylindrical shell 111 defined in a cylindrical shape, and a pair of shell covers 112 and 113 coupled to opposite end portions of the cylindrical shell 111. The pair of shell covers 112 and 113 can include a first shell cover 112 at a rear refrigerant suction side and a second shell cover 113 at a front refrigerant discharge side.

The cylindrical shell 111 can have a cylindrical shape extending in a lateral direction. In some examples, the cylindrical shell 111 can be defined in a cylindrical shape extending in a longitudinal direction. In some implementations, a description will be given focusing on an example in which the cylindrical shell 111 is extended in the lateral direction. Accordingly, a central axis of the cylindrical shell 111 in a lengthwise direction corresponds to a central axis of the compressor body C, to be described later, and the central axis of the compressor body C corresponds to central axes of the piston 142 and the cylinder 141 composing the compressor body C.

The cylindrical shell 111 can have various inner diameters depending on a size of a motor 130. In the linear compressor, since an oil bearing is excluded and a gas bearing is applied, an inner space 110a of the shell 110 may not be filled with oil. Therefore, in some implementations, an inner diameter of the cylindrical shell 111 can be defined as small as possible, and have an enough size to avoid contact between a frame head portion 121 of a frame 120 to be described later and an inner circumferential surface of the shell 110. Accordingly, in the linear compressor, an outer diameter of the cylindrical shell 111 can be formed small.

Opposite ends of the cylindrical shell 111 can be opened, and the first shell cover 112 and the second shell cover 113 described above can be respectively coupled to each end of the cylindrical shell 111. The first shell cover 112 can be coupled to seal a right opening end, which is a rear side of the cylindrical shell 111, and the second shell cover 113 can be coupled to seal a left opening end, which is a front side of the cylindrical shell 111.

Accordingly, the inner space 110a of the shell 110 is sealed. The first shell cover 112 can be provided with a refrigerant suction pipe 1141 configured to guide refrigerant to the inner space 110a of the shell 110 coupled therethrough. The cylindrical shell 111 can be provided with a refrigerant discharge pipe 1142 configured to guide compressed refrigerant to the refrigeration cycle, and a refrigerant injection pipe (e.g., loop pipe 1143) configured to replenish refrigerant, respectively coupled therethrough.

A front side surface of the cylindrical shell 111 can be provided with a terminal bracket 115, and the terminal bracket 115 can be provided with a terminal 1151 formed through the cylindrical shell 111 and configured to transmit external power to the linear motor.

Next, an interior of the shell will be described.

Referring to FIG. 2, the compressor body C can be provided inside the cylindrical shell 111, and a rear support spring (hereinafter, a first support spring) 1161 and a front support spring (hereinafter, a second support spring) 1162 each supporting the compressor body C can be installed at a rear side and a front side of the compressor body C, respectively.

The first support spring 1161 can be implemented as a leaf spring provided between a rear surface of a rear cover 1612 to be described later and the first shell cover 112 facing the same, and the second support spring 1162 can be implemented as a compressed coil spring provided between an outer circumferential surface of a cover housing 1555 to be described later and an inner circumferential surface of the cylindrical shell 111 facing the same.

In addition, stoppers 1171 and 1172 to lock the compressor body C with respect to the shell 110 can be installed inside the shell 110. The stoppers 1171 and 1172 can include a first stopper 1171 to lock the rear side of the compressor body C and a second stopper 1172 to lock the front side of the compressor body C.

The first stopper 1171 can be implemented as a bracket installed at the inner circumferential surface of the cylindrical shell 111 to correspond to the rear cover 1612 to be described later, and the second stopper 1172 can be implemented as a ring installed at the outer circumferential surface of the cover housing 1555, to be described later, to correspond to an inner surface of the second shell cover 113.

The first stopper 1171 can lock the compressor body C in the axial direction (front-rear direction, and lateral direction), and the second stopper 1172 can lock the compressor body C in a radial direction. Accordingly, breakage of the compressor body due to collision with the shell 110 caused by shaking, vibration, or impact occurred during transportation of the compressor can be prevented or reduced.

Next, the compressor body will be described.

Referring to FIG. 2, the compressor body C can include the frame 120, a motor unit 130 implemented as a linear motor, a compression unit 140, a suction and discharge unit 150, and a resonance unit 160. Front sides of the motor unit 130 and the compression unit 140 can be fixed to the frame 120, and the motor unit 130 and the compression unit 140 can be elastically supported by the resonance unit 160.

The frame 120 can include the frame head portion 121 and a frame body portion 122. The frame head portion 121 is defined in a disk shape, and the frame body portion 122 is defined in a cylindrical shape extending from a rear surface of the frame head portion 121.

The rear surface of the frame head portion 121 can be provided with an outer stator 131 to be described later coupled thereto, and a front surface of the frame head portion 121 can be provided with a discharge cover assembly 146 to be described later coupled thereto. An outer circumferential surface of the frame body portion 122 can be provided with an inner stator 132 to be described later coupled thereto, and an inner circumferential surface of the frame body portion 122 can be provided with the cylinder 141 coupled thereto.

The frame 120 includes a gas bearing passage portion forming a bearing inlet groove 125a, a bearing communication hole 125b, and a bearing communication groove 125c.

The bearing inlet groove 125a can be formed at one side of the front surface of the frame head portion 121, the bearing communication hole 125b can penetrate from a rear surface of the bearing inlet groove 125a to the inner circumferential surface of the frame body portion 122, and the bearing communication groove 125c can be formed on the inner circumferential surface of the frame body portion 122 to communicate with the bearing communication hole 125b.

For example, the bearing inlet groove 125a can be recessed in the axial direction by a predetermined depth from the front surface of the frame head portion 121, and the bearing communication hole 125b with a cross-sectional area smaller than the bearing inlet groove 125a can be inclined toward the inner circumferential surface of the frame body portion 122.

The bearing communication groove 125c can be defined in an annular shape having a predetermined depth and a predetermined axial length on the inner circumferential surface of the frame body portion 122. However, the bearing communication groove 125c can be formed on an outer circumferential surface of the cylinder 141 which is in contact with the inner circumferential surface of the frame body portion 122, or a half of the bearing communication groove 125c can be formed on the inner circumferential surface of the frame body portion 122 and another half thereof can be formed on the outer circumferential surface of the cylinder 141.

In addition, a gas bearing 1411 communicating with the bearing communication groove 125c can be provided in the cylinder 141 corresponding to the bearing communication groove 125c. The gas bearing will be described again later with the cylinder.

Next, the motor unit will be described.

Referring to FIG. 2, the motor unit 130 includes a stator 130a and a mover 130b reciprocating with respect to the stator 130a.

The stator 130a can include the outer stator 131 and the inner stator 132. The outer stator 131 can be fixed to the frame head portion 121 while surrounding the frame body portion 122 of the frame 120, and the inner stator 132 can be disposed inside the outer stator 131 with being spaced apart from the outer stator 131 by a predetermined gap 130c.

The outer stator 131 can include a coil winding body 1311 and an outer stator core 1312. The coil winding body 1311 can be accommodated in the outer stator core 1312. However, in some cases, the coil winding body 1311 can be accommodated in the inner stator 132.

The coil winding body 1311 can include a bobbin 1311a defined in an annular shape and a coil 1311b wound in a circumferential direction of the bobbin 1311a. The bobbin 1311a can be provided with a terminal portion to guide a power line drawn out from the coil 1311b to be drawn out or exposed outwardly of the outer stator 131.

The outer stator core 1312 can include a plurality of core blocks stacked in a circumferential direction of the bobbin 1311a so as to surround the coil winding body 1311. And, a plurality of lamination sheets each defined in a shape are stacked to form the core block.

A rear side of the outer stator 131 can be provided with a stator cover 1611 to fix the outer stator 131 thereon. For example, a front surface of the outer stator 131 is supported by the frame head portion 121, and a rear surface of the outer stator 131 is supported by the stator cover 1611. In addition, a rod-shaped cover coupling member 136 can penetrate the stator cover 1611 to pass an edge of the outer stator 131 to thereby be inserted into the frame head portion 121. Accordingly, the motor unit 130 can be stably fixed between the rear surface of the frame head portion 121 and a front surface of the stator cover 1611 by the cover coupling member 136.

Here, the stator cover 1611 not only supports the outer stator 131, but supports a front spring to be described later. Accordingly, the stator cover 1611 can include a part of the motor unit 130, but also include a part of the resonance unit 160. In some implementations, the stator cover 1611 is defined as a part of the resonance unit 160 and will be described later together with the resonance unit.

The inner stator 132 can be inserted into the inner circumferential surface of the frame body portion 122. The inner stator 132 can be stacked in the circumferential direction on an outer side of the frame body portion 122 so that a plurality of lamination sheets forming the inner stator core surround the frame body portion 122.

The mover 130b includes a magnet frame 1331 and a magnet 1332 supported by the magnet frame 1331.

The magnet frame 1331 can be defined in a cylindrical shape with an open front surface and a closed rear surface. Accordingly, a front side of the magnet frame 1331 can be inserted from a rear side to a front side of the motor unit 130 so as to be disposed in a gap between the outer stator 131 and the inner stator 132, and a rear side of the magnet frame 1331 can be disposed between the rear side of the motor unit 130 and a front side of the resonance unit 160.

A front outer circumferential surface of the magnet frame 1331 can be provided with the magnet 1332 fixedly installed thereon. For example, a magnet insertion groove can be formed on the front outer circumferential surface of the magnet frame 1331, and the magnet 1332 can be inserted into the magnet insertion groove. The magnet 1332 can be provided in plurality and fixed at predetermined intervals in the circumferential direction, or can be formed in a single cylindrical shape to be fixed thereto.

A muffler insertion hole 1331a can be formed in a center of a rear surface of the magnet frame 1331, and a suction muffler 151 can be inserted into the muffler insertion hole 1331a. The suction muffler will be described again later.

The rear surface of the magnet frame 1331 can be provided with a spring supporter 1613 coupled thereto together with the piston 142, to be described later. The piston and the spring support will be described later together with the compression unit and the resonance unit.

Next, the compression unit will be described.

Referring to FIG. 2, the compression unit 140 can include the cylinder 141, the piston 142, a suction valve 143, a discharge valve assembly 144, the suction muffler 151, and a discharge cover assembly 155.

The cylinder 141 can be made of a material which is light and has excellent processability, such as an aluminum material (aluminum or aluminum alloy). The cylinder 141 can be defined in a cylindrical shape and inserted into the frame 120.

The piston 142 is inserted into the cylinder 141 to form a compression space V inside a front side of the cylinder 141 while reciprocating. The compression space V is provided with the suction valve 143 and the discharge valve assembly 144 to be described later, each to communicate with a suction flow path 1421 of the piston 142, and a discharge space S of the discharge valve assembly 144 to be described later.

The cylinder 141 can be provided with the gas bearing 1411. The gas bearing 1411 is formed through the outer circumferential surface and an inner circumferential surface of the cylinder 141 in the radial direction at a position in communication with the bearing communication groove 125c. Accordingly, some portion of refrigerant discharged into the discharge space S is supplied to a bearing surface between the inner circumferential surface of the cylinder 141 and an outer circumferential surface of the piston 142, through the gas bearing passage portion and the gas bearing 1411. As the refrigerant creates a high pressure, the piston 142 floats from the cylinder 141 to reciprocate while being spaced apart from the cylinder 141.

Here, a range of the bearing surface can vary according to the reciprocating motion of the piston 142. Accordingly, a front side of the bearing surface can communicate with the compression space V, and a rear side of the bearing surface can communicate with the inner space 110a of the shell 110 forming the suction space.

Here, when the gas bearing 1411 is too close to the compression space V or the suction space, the high-pressure refrigerant supplied to the bearing surface leaks into the compression space V or the suction space, thereby reducing compressor efficiency. Therefore, in some implementations, the gas bearing 1411 can be located at a position not directly communicated with the compression space V or the suction space.

The piston 142 can be made of an aluminum material, like the cylinder 141. The piston 142 can be defined in a cylindrical shape in which a front end thereof is partially opened while a rear end thereof is fully opened.

In addition, the open rear end of the piston 142 can be connected to the magnet frame 1331. Accordingly, the piston 142 can reciprocate together with the magnet frame 1331.

In addition, the suction flow path 1421 is formed through the piston 142 in the axial direction, and a suction port 1422 to communicate between the suction flow path 1421 and the compression space V is formed at a front end of the piston 142. The suction port 1422 can be formed such that only one suction port 1422 is formed at a center of the front end of the piston 142 or a plurality of suction ports 1422 are formed at a periphery of the front end of the piston 142.

In addition, a front surface of the piston 142 can be provided with the suction valve 143 to selectively open and close the suction port 1422.

The suction valve 143 can be implemented as a thin steel plate and bolted to a front end surface of the piston 142. The suction valve 143 can be implemented as a type of a reed valve having one or more opening and closing portions.

The discharge valve assembly 144 can be provided at a front end of the cylinder 141 to open and close a discharge side of the compression space V. The discharge valve assembly 144 can be accommodated in the discharge space S of the discharge cover assembly 146 to be described later.

The discharge valve assembly 144 can include a discharge valve 1441, a valve spring 1442, and a spring support member 1443.

The discharge valve 1441 can include a valve body portion 1441a facing the cylinder 141, and a spring coupling portion 1441b facing the discharge cover assembly 155. The valve body portion 1441a and the spring coupling portion 1441b can be molded into a single body, or can be fabricated separately then assembled.

In addition, the valve body portion 1441a can be defined in a disk shape or a hemispherical shape, and the spring coupling portion 1441b can be defined in a rod shape extending in the axial direction from a center of a front surface of the valve body portion 1441a.

In addition, the valve body portion 1441a can be formed by resin containing carbon fibers. The carbon fibers can be irregularly arranged, or can be regularly arranged such as being woven in a lattice shape or arranged in one direction. For example, when the carbon fibers are regularly arranged, the carbon fibers can be arranged parallel to a front end surface of the cylinder 141 so as to reduce damage on the cylinder upon collision.

The valve spring 1442 can be implemented as a leaf spring or a compressed coil spring. The valve spring 1442 can be implemented as a disk-shaped leaf spring and be coupled to the spring coupling portion 1441b.

The spring support member 1443 can be defined in an annular shape, and can enclose a rim of the valve spring 1442 in such a manner that the valve spring 1442 is inserted into an inner circumferential surface of the spring support member 1443. A thickness of the spring support member 1443 is greater than a thickness of the valve spring 1442 so that the valve spring 1442 generates an elastic force.

Next, the suction and discharge unit will be described.

Referring to FIG. 2, the suction and discharge unit 150 includes the suction muffler 151 and the discharge cover assembly 155. The suction muffler 151 is provided at the suction side, and the discharge cover assembly 155 is provided at the discharge side with the compression space V interposed therebetween.

The suction muffler 151 can pass through the muffler insertion hole 1331a of the magnet frame 1331 so as to be inserted into the suction flow path 1421 of the piston 142. Accordingly, refrigerant suctioned into the inner space 110a of the shell 110 is introduced into the suction flow path 1421 through the suction muffler 151 to open the suction valve 143 to thereby be suctioned into the compression space V formed between the piston 142 and the cylinder 141 through the suction port 1422.

In addition, the suction muffler 151 can be fixed to the rear surface of the magnet frame 1331. For example, the suction muffler 151 is coupled to the piston 142 to be described later. The suction muffler 151 can reduce noise generated while refrigerant is suctioned into the compression space V through the suction flow path 1421 of the piston 142.

In addition, the suction muffler 151 can include a plurality of mufflers. For example, the plurality of mufflers can include a first muffler 1511, a second muffler 1512, and a third muffler 1513 to be coupled to each other.

The first muffler 1511 is disposed inside the piston 142, and the second muffler 1512 is coupled to a rear end of the first muffler 1511. Further, the third muffler 1513 can accommodate the second muffler 1512 therein, and a front end of the third muffler 1513 can be coupled to the rear end of the first muffler 1511. Accordingly, refrigerant can sequentially pass through the first muffler 1511, the second muffler 1512, and the third muffler 1513. In this process, flow noise of the refrigerant can be attenuated.

In addition, the suction muffler 151 can be provided with a muffler filter 1514 mounted thereon. The muffler filter 1514 can be disposed at a boundary at which the second muffler 1512 and the third muffler 1513 are coupled. For example, the muffler filter 1514 can be defined in a circular shape, and a rim of the muffler filter 1514 can be supported with being placed between surfaces of the second muffler 1512 and the third muffler 1513 where the second muffler 1512 and the third muffler 1513 are coupled.

The discharge cover assembly 155 can receive the discharge valve assembly 144 so as to be coupled to a front surface of the frame 120. The discharge cover assembly 155 can be implemented as a single discharge cover or can be implemented as a plurality of discharge covers. The discharge cover assembly 155 in some implementations is formed such that the plurality of discharge covers are arranged to overlap each other. For convenience, a discharge cover located inside is defined as a discharge cover, and a discharge cover located outside is defined as a cover housing according to an order of discharge of refrigerant.

For example, the discharge cover assembly 155 can include a discharge cover 1551 accommodating the discharge valve assembly 144, and the cover housing 1555 accommodating the discharge cover 1551 and fixed to the front surface of the frame 120. The discharge cover 1551 can be made of engineering plastic that withstands high temperature, and the cover housing 1555 can be made of aluminum die-cast.

The discharge cover 1551 can include a cover body portion 1551a, a cover flange portion 1551b radially extending from an outer circumferential surface of the cover body portion 1551a, and a cover protrusion 1551c forwardly extending from the cover flange portion 1551b.

The cover body portion 1551a can be defined in a container shape with an open rear surface and a partially closed front surface, and can be inserted into an outer discharge space S2 of the cover housing 1555 to be described later. An inner space of the cover body portion 1551a forms an inner discharge space S1. As the discharge valve assembly 144 is accommodated in the inner discharge space S1, the inner discharge space S1 forms a first discharge space with respect to an order of discharge of refrigerant.

A central portion of a front surface of the cover body portion 1551a can be provided with a cover boss portion 1551d extending therefrom in a direction toward the discharge valve assembly 144. The cover boss portion 1551d is defined in a cylindrical shape, and a center of a rear surface of the cover boss portion 1551d can be provided with a communication hole 1551e formed therethrough to communicate between the inner discharge space S1 of the discharge cover 1551 and the outer discharge space S2 of the cover housing 1555. Accordingly, the outer discharge space S2 forms a second discharge space with respect to an order of discharge of refrigerant.

The cover flange portion 1551b can extend in a flange shape from a front outer circumferential surface of the cover body portion 1551a. A rear surface of the cover flange portion 1551b can be closely adhered to and supported by the spring support member 1443 forming a part of the discharge valve assembly 144 in the axial direction, and a front surface of the cover flange portion 1551b can be closely adhered to and supported by a cover support portion 1555b of the cover housing, to be described later, in the axial direction.

The cover protrusion 1551c can extend from an edge of a front surface of the cover flange portion 1551b toward an inner surface of the cover housing 1555. The cover protrusion 1551c can be defined in a cylindrical shape. Accordingly, an outer circumferential surface of the cover protrusion 1551c can be closely adhered to and supported by an inner surface of a housing circumferential wall portion 1555a of the cover housing 1555, to be described later, in the radial direction.

In some implementations, the cover housing 1555 can be fixed to the front surface of the frame head portion 121, and forms the outer discharge space S2 therein. One side of the outer discharge space S2 can communicate with the inner discharge space S1 of the discharge cover 1551 through the communication hole 1551e of the discharge cover 1551 described above, and another side of the outer discharge space S2 can be connected to the refrigerant discharge pipe 1142 through a loop pipe 1143.

For example, the cover housing 1555 is defined in a container shape with a closed front surface and an open rear surface. The housing circumferential wall portion 1555a forming a side wall surface of the cover housing 1555 can be defined in a substantially cylindrical shape, and a rear end of the housing circumferential wall portion 1555a can be closely coupled to the front surface of the frame 120 with an insulating member disposed therebetween.

Inside the cover housing 1555, there can be provided the cover support portion 1555b extending from an inner front surface toward the frame 120. The cover support portion 1555b can be defined in a cylindrical shape with being spaced apart from the housing circumferential wall portion 1555a of the cover housing 1555 by a predetermined distance. Accordingly, an inner space of the cover housing 1555 can be divided into an inner space and an outer space in the radial direction by the cover support portion 1555b.

The cover body portion 1551a of the discharge cover 1551 can be inserted into the inner space of the cover housing 1555, and the cover protrusion 1551c of the discharge cover 1551 can be inserted into an outer space of the cover housing 1555. The cover flange portion 1551b of the discharge cover 1551 can be supported in the axial direction at a front end of the cover support portion 1555b.

In addition, a circumferential wall surface of the cover housing 1555 is provided with a pipe coupling portion formed therethrough, and one end of the loop pipe 1143 bent several times in the inner space 110a of the shell 110 is connected to the pipe coupling portion. Another end of the loop pipe 1143 is connected to the refrigerant discharge pipe 1142. Accordingly, refrigerant discharged to the outer discharge space S2 can be guided to the refrigerant discharge pipe 1142 through the loop pipe 1143, and the refrigerant can be guided to the refrigeration cycle device through the refrigerant pipe.

Next, the resonance unit will be described.

Referring to FIG. 2, the resonance unit 160 can include a support portion 161 and a spring 162 supported by the support portion 161.

The support portion 161 can include members each supporting a front end and a rear end of the spring 162, respectively. For example, the support portion 161 can include a stator cover 1611, a rear cover 1612, and a spring supporter 1613.

As described above, the stator cover 1611 is in close contact with the rear surface of the outer stator 131 and fixed to the frame 120 by the cover coupling member 136, and the rear cover 1612 is fixedly coupled to a rear surface of the stator cover 1611. In addition, the spring supporter 1613 is coupled to the magnet frame 1331 and the piston 142, and is disposed between the stator cover 1611 and the rear cover 1612.

Accordingly, with respect to the spring supporter 1613, the stator cover 1611 can be disposed forward and the rear cover 1612 can be disposed rearward. In addition, a first spring 1621 to be described later can be installed between the stator cover 1611 and the spring supporter 1613, and a second spring 1622 to be described later can be installed between the spring supporter 1613 and the rear cover 1612.

The stator cover 1611 can be defined in an annular shape as described above, the rear cover 1612 can have a support leg portion 1612a so as to be axially spaced apart from the stator cover 1611, and the spring supporter 1613 can be spaced apart from the stator cover 1611 and the rear cover 1612, respectively, with a supporter body portion 1616 to be described later being extended in the axial direction.

A length of the supporter body portion 1616 can shorter than the support leg portion 1612a of the rear cover 1612. In other words, the length of the supporter body portion 1616 can be about half the support leg portion 1612a. Accordingly, the spring support portion 1617 of the spring supporter 1613 to be described later can be disposed at an intermediate position between the stator cover 1611 and the rear cover 1612.

However, when the spring 162 is implemented as a single body, the spring supporter 1613 can be excluded. However, in some implementations, an example in which the spring 162 includes the first spring 1621 installed at a front side and the second spring 1622 installed at a rear side with the spring supporter 1613 disposed therebetween will be mainly described.

The spring supporter 1613 is fixedly coupled to the rear surface of the magnet frame 1331. Accordingly, the spring supporter 1613 is integrally coupled to the magnet frame 1331 and the piston 142 so as to reciprocate in a straight line together with the magnet frame 1331 and the piston 142.

For example, the spring supporter 1613 can include a supporter fixing portion 1615, the supporter body portion 1616, and the spring support portion 1617.

The supporter fixing portion 1615 can be defined in a disk shape, and a muffler insertion hole 1615a through which the suction muffler 151 passes can be formed at a central portion of the supporter fixing portion 1615. Fastening holes 1615b and refrigerant through holes 1615c can be formed along a circumference of the muffler insertion hole 1615a.

The supporter body portion 1616 can be bent rearwardly in a cylindrical shape from a rim of the supporter fixing portion 1615, and a plurality of refrigerant through holes 1616a can be formed in the circumferential direction. However, the supporter body portion 1616 is not necessarily limited to the cylindrical shape. For example, the supporter body portion 1616 can be defined in a shape of a plurality of legs arranged at predetermined intervals in the circumferential direction.

The spring support portion 1617 can extend radially outwardly from an end portion of the supporter body portion 1616. The spring support portion 1617 can be provided in plurality, and the plurality of spring support portions 1617 can be formed at predetermined intervals in the circumferential direction.

The spring support portion 1617 can also be defined in a single flange shape. However, when the spring support portion 1617 is defined in a single flange shape, a size of the compressor can increase as an inner diameter of the rear cover 1612 should be increased in consideration of interference with the rear cover 1612 to be described later.

Accordingly, the spring support portion 1617 can be provided in plurality to be spaced apart from each other at a predetermined interval in the circumferential direction, and the support leg portions 1612a of the rear cover 1612 can be alternately disposed between the spring support portions 1617 in the circumferential direction. Accordingly, the inner diameter of the rear cover 1612 may not need to be increased, which may help to reduce the size of the compressor.

Further, referring to FIG. 2, spring caps 163 can be coupled to each of the spring support portions 1617, and an end portion of the spring 162 can be fixedly inserted onto the spring cap 163. Accordingly, a state in which the spring 162 is assembled to the spring support portion can be maintained.

To this end, cap support holes 1617a are formed through the plurality of spring support portion 1617, respectively. The cap support holes 1617a can be formed according to the number and position of the first spring 1621 and the second spring 1622 facing each other.

For example, when the first spring 1621 and the second spring 1622 are respectively coupled to a front surface and a rear surface of the spring support portion 1617 as in some implementations, each of the spring support portions 1617 can be provided with two cap support holes 1617a formed therethrough. In addition, the spring cap 163 can be fixedly inserted into each of the cap support holes 1617a.

Accordingly, when six first springs 1621, six second springs 1622, and three spring support portions 1617 are provided, each of the three spring support portions 1617 supports two first springs 1621 and two second springs 1622, and therefore, a total of 12 spring caps 163 can be provided at front and rear surfaces of the spring support portions 1617. Hereinafter, a spring cap provided at the front surface of the spring support portion 1617 to which the first spring 1621 is coupled is defined as a first cap 1631, and a spring cap provided at the rear surface of the spring support portion 1617 to which the second spring 1622 is coupled is defined as a second cap 1632.

The plurality of spring caps 163 can be identical to each other. For example, the spring caps 163 provided in the circumferential direction each can include the first cap 1631 and the second cap 1632 identical to each other.

Here, the first cap 1631 and the second cap 1632 can be formed symmetrically with respect to each of the spring support portions 1617, or can be formed differently. In other words, when the spring cap 163 acts as a silencer such as a Helmholtz resonator, the spring cap 163 can be defined in various shapes.

However, in some implementations, an example in which the first cap 1631 and the second cap 1632 formed somewhat differently will be described first. Further, an example in which the first cap 1631 and the second cap 1632 are formed symmetrically will be described later in another implementation.

Referring to FIG. 2, the spring 162 can include the first spring 1621 and the second spring 1622.

The first spring 1621 and the second spring 1622 each can be implemented as a compressed coil spring. The first spring 1621 and the second spring 1622 can be disposed symmetrically in the axial direction with the spring support portion 1617 interposed therebetween.

For example, a front end of the first spring 1621 can be supported by the rear surface of the stator cover 1611, and a rear end of the first spring 1621 can be supported by the front surface of the spring support portion 1617. The rear surface of the stator cover 1611 can be provided with a first spring support protrusion 1611a so that the front end of the first spring 1621 is supportively inserted thereinto, and the first cap 1631 described above can be coupled to the front surface of the spring support portion 1617.

In addition, a front end of the second spring 1622 can be supported by the rear surface of the spring support portion 1617, and a rear end of the second spring 1622 can be supported by a front surface of the rear cover 1612. The second cap 1632 described above can be coupled to the rear surface of the spring support portion 1617, and the front surface of the rear cover 1612 can be provided with a second spring support protrusion 1612b so that the rear end of the second spring 1622 is supportively inserted thereinto.

Accordingly, the first springs 1621 provided at the front side of the spring supporter 1613 and the second springs 1622 provided at the rear side of the spring supporter 1613 stretch and contract in opposite directions to thereby allow the mover 130b and the piston 142 to perform a reciprocating motion while resonating.

The linear compressor of the present disclosure can operate as follows.

When current is applied to the winding coil 134 of the motor unit 130 to form a magnetic flux between the outer stator 131 and the inner stator 132, the mover 130b including the magnet frame 1331 and the magnet 1332 reciprocates in a gap between the outer stator 131 and the inner stator 132 by an electromagnetic force generated by the magnetic flux.

Then, the piston 142 connected to the magnet frame 1331 reciprocates in the axial direction in the cylinder 141 to thereby increase or decrease a volume of the compression space V. Here, when the piston 142 is moved backward to increase the volume of the compression space V, the suction valve 143 is opened so that refrigerant in the suction flow path 1421 is introduced into the compression space V. On the other hand, when the piston 142 is moved forward to decrease the volume of the compression space V, pressure in the compression space V increases. Then, refrigerant compressed in the compression space V opens the discharge valve 1441 to thereby be discharged to a first discharge space S1 of the discharge cover 1551.

Then, the refrigerant discharged to the first discharge space S1 moves to a second discharge space S2 of the cover housing 1555 through the communication hole 1551e. Here, part of the refrigerant moving from the first discharge space S1 to the second discharge space S2 is introduced into the bearing inlet groove 125a forming an inlet of the gas bearing. The refrigerant is then supplied to the bearing surface between the inner circumferential surface of the cylinder 141 and the outer circumferential surface of the piston 142 through the bearing communication hole 125b, the bearing communication groove 125c, and the gas bearing 1411 of the cylinder 141. Thereafter, high-pressure refrigerant supplied the bearing surface lubricates between the cylinder 141 and the piston 142, and then partly flows into the compression space V and the rest flows into the inner space 110a of the shell 110 which is a suction space.

The refrigerant introduced into the second discharge space S2 is discharged outwardly of the compressor through the loop pipe 1143 and the refrigerant discharge pipe 1142, then moved to a condenser of the refrigeration cycle. This series of processes is repeatedly performed.

In some implementations, while the compressor is operating, noise in various frequency bands may be generated and transmitted out of the shell. Accordingly, a separate silencer such as a dynamic damper may be installed inside or outside the shell to attenuate noise of the compressor.

However, when the silencer is installed inside the shell, this can increase not only the number of components and assemblers but also a volume of the shell to thereby increase a manufacturing cost and a size of the compressor. And, when the silencer is installed outside the shell, this may not only increase the manufacturing cost and the size of the compressor but make an appearance of the compressor complicated.

With this reason, in some implementations, a separate silencer is not installed inside or outside the shell, and noise of the compressor is effectively canceled by using existing components.

Figure 3:
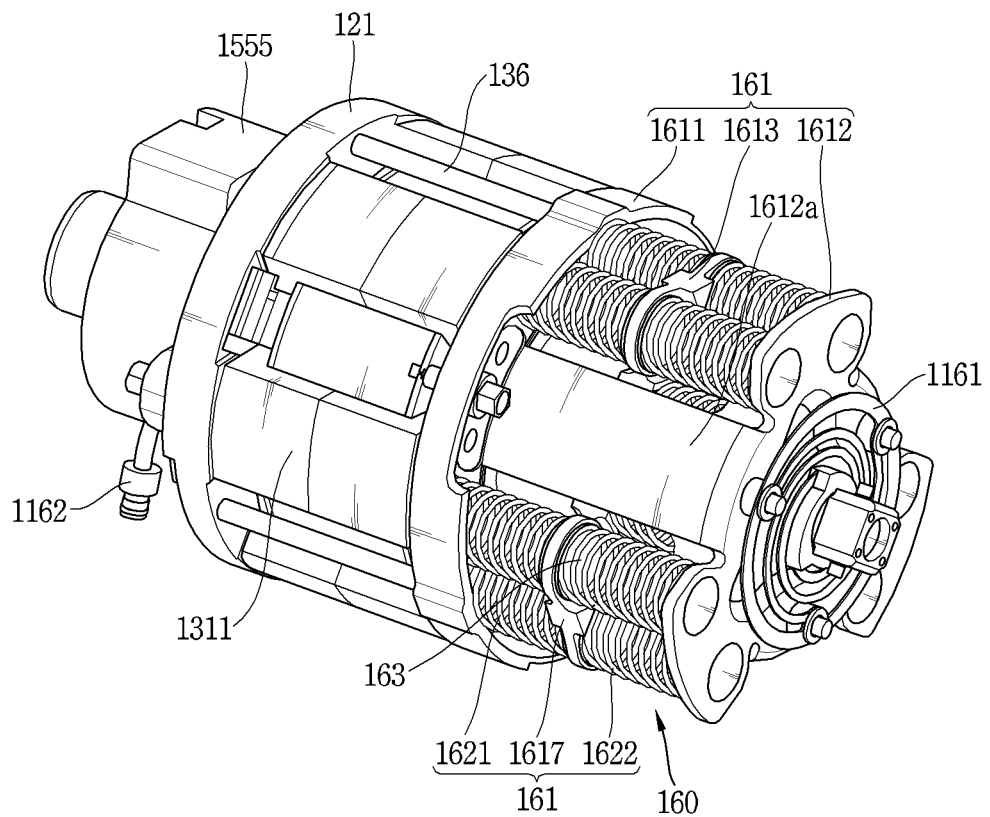
FIG. 3 is a perspective view illustrating an example of a main body of the compressor of FIG. 1 viewed from rear.
Figure 4:
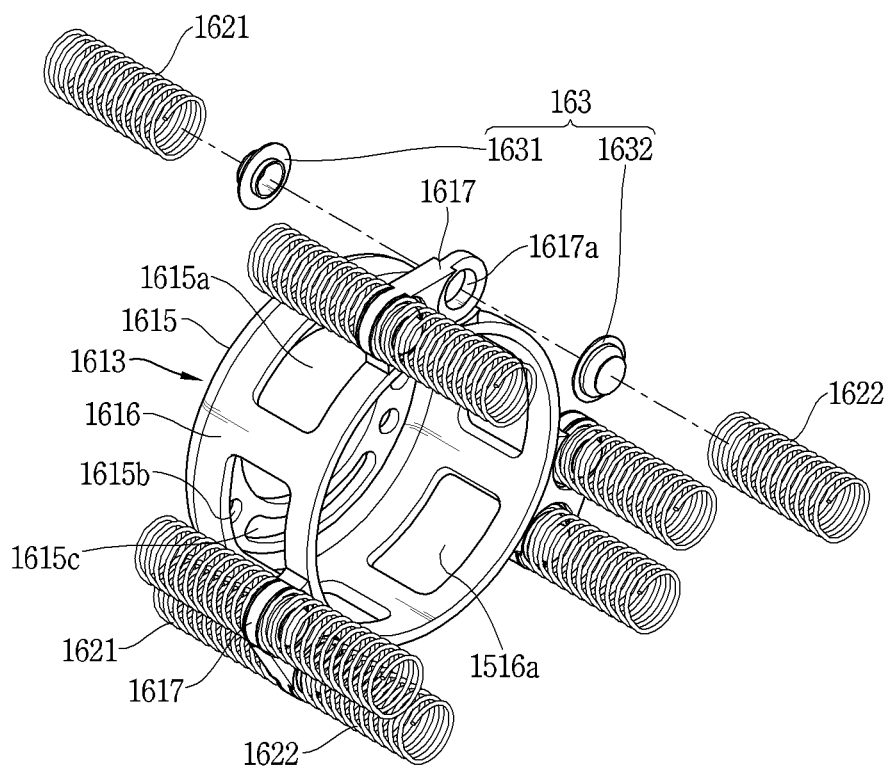
FIG. 4 is an exploded perspective view illustrating an example of a resonance unit of FIG. 3.

FIG. 3 is a perspective view illustrating a main body of the compressor of FIG. 1 viewed from rear, and FIG. 4 is an exploded perspective view illustrating a resonance unit of FIG. 3.

Referring to FIGS. 3 and 4, the spring supporter 1613 includes the plurality of spring support portions 1617. Each of the spring support portions 1617 is bent to extend in the radial direction from a rear end of the supporter body portion 1616.

The plurality of spring support portions 1617 are formed at predetermined intervals in the circumferential direction. For example, the plurality of spring support portions 1617 are arranged at equal intervals of 120 degrees, and the spring support portions 1617 can be identical to each other.

Each of the spring support portions 1617 can be defined in an arc shape elongated in the circumferential direction, and the spring support portions 1617 each can have two cap support holes 1617a spaced apart a predetermined distance from each other in the circumferential direction.

The cap support holes 1617a can all be identical to each other. For example, the cap support holes 1617a can have inner diameters same as each other and can be formed through the spring support portions 1617 in the axial direction.

In addition, the spring cap 163 can be inserted into the cap support hole 1617a. The spring cap can include the first cap 1631 and the second cap 1632, and the first cap 1631 and the second cap 1632 can be respectively inserted into the cap support hole 1617a from opposite directions in the axial direction. The spring caps 163 can be formed to have a same standard or different standard in the circumferential direction.

Here, the standard can be defined as a shape. That is, as the spring cap 163 is a kind of Helmholtz resonator, the same standard can be understood that the spring caps 163 are defined in a shape identical to each other to attenuate noise in a same frequency band (Hz). Therefore, hereinafter, an expression that the shapes of the spring caps 163 are identical or symmetrical to each other can be understood as a meaning that the standards of the spring caps 163 are the same.

Figure 5A:
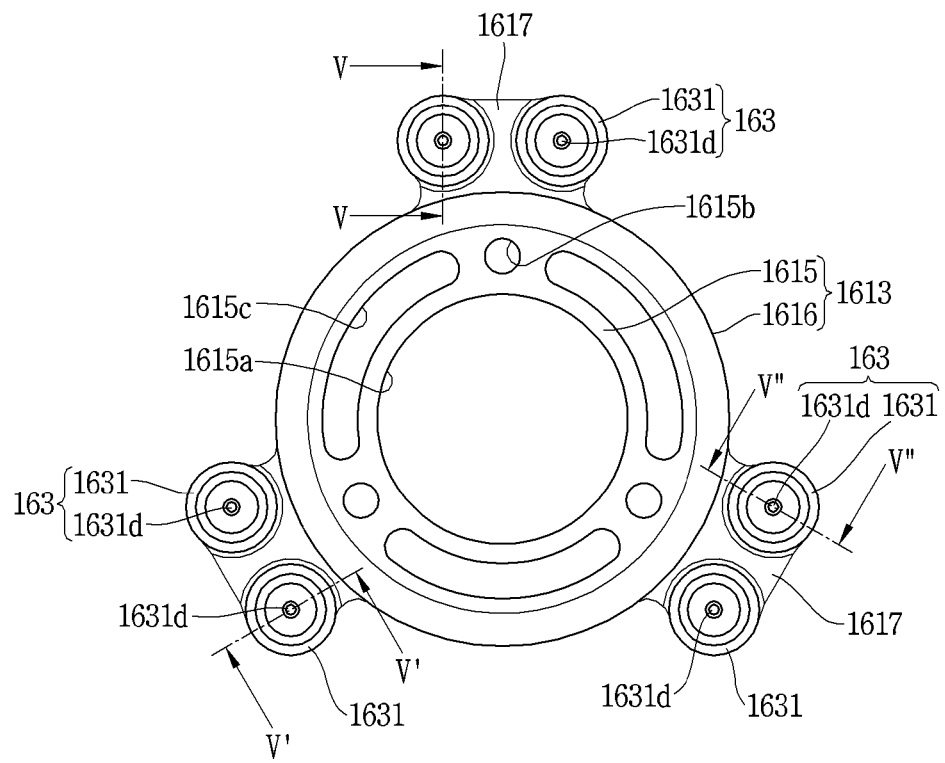
FIG. 5A illustrates a planar view illustrating an example of a spring supporter equipped with spring caps having identical shapes.
Figure 5B:
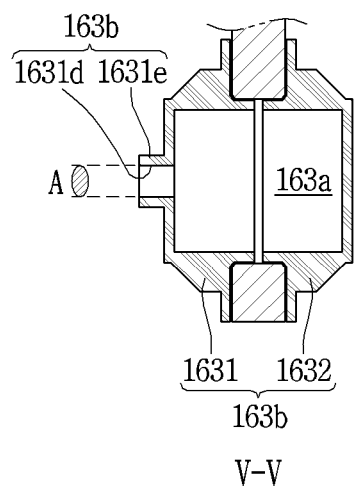
FIGS. 5B to 5D are cross-sectional views taken along lines V-V, V'-V', and V"-V" in FIG. 5A, illustrating each of the spring caps.
Figure 5C:
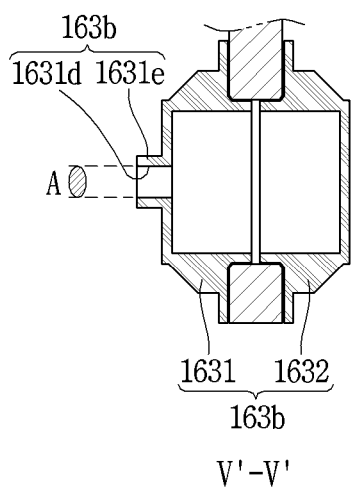
Figure 5D:
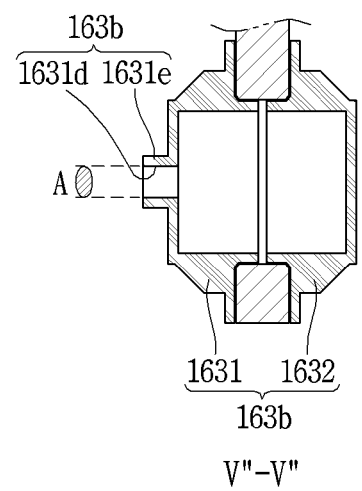

FIG. 5A illustrates a planar view of a spring supporter equipped with spring caps of identical standards (e.g., shapes or sizes), and FIGS. 5B to 5D are cross-sectional views taken along lines V-V, V'-V', and V"-V" in FIG. 5A, illustrating each of the spring caps.

Referring to FIGS. 5A to 5D, the spring caps 163 are coupled to each of the cap support holes 1617a formed at each of the spring support portions 1617, and these spring caps 163 can be defined in shapes identical to each other.

For example, when two spring caps 163 are provided at each of the spring support portions 1617 of the spring supporter 1613, the two spring caps 163 can be defined in a shape same as a shape of other two spring caps 163 adjacent thereto.

In other words, referring to the cross-sectional views taken along the lines V-V, V'-V', and V"-V" illustrating spring caps 163 mounted on each of the spring support portions 1617, each of volumes of space portions 163a, each of cross-sectional areas of passage portions, and each of lengths of the passage portions 163b can respectively be identical to each other. In FIGS. 5B to 5D, the cross-sectional areas of the passage portions are illustrated to have a cross-sectional area "A" identical to each other.

Figure 6:
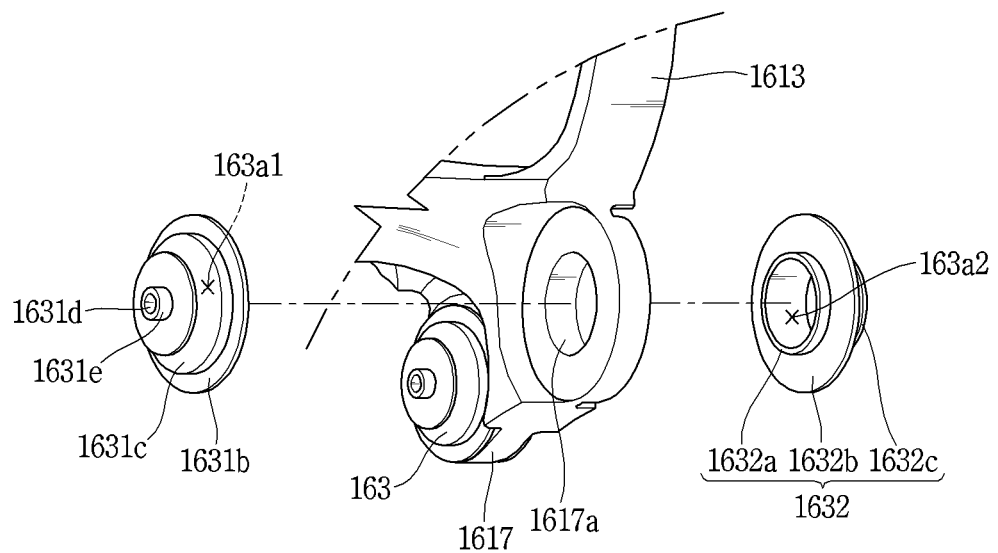
FIG. 6 is a perspective view of an example of a spring cap disassembled from the spring supporter.

Hereinafter, one spring support portion 1617 and one cap support hole 1617a will be described as representative examples. FIG. 6 is a perspective view of a spring cap disassembled from the spring supporter, FIG. 7 is a perspective view illustrating the spring cap of FIG. 6 assembled to the spring supporter, and FIG. 8 is a cross-sectional view illustrating the spring cap of FIG. 7 assembled to the spring supporter.

Figure 7:
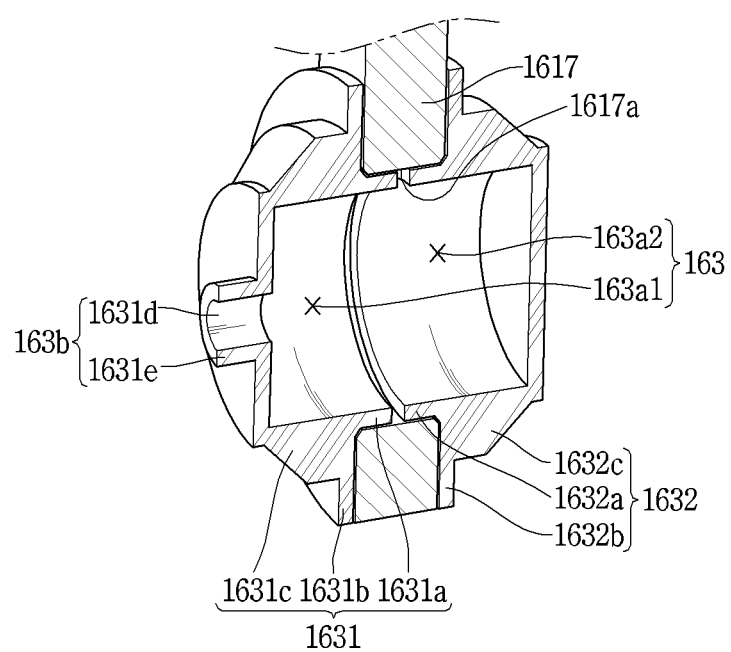
FIG. 7 is a perspective view illustrating the spring cap of FIG. 6 assembled to the spring supporter.
Figure 8:
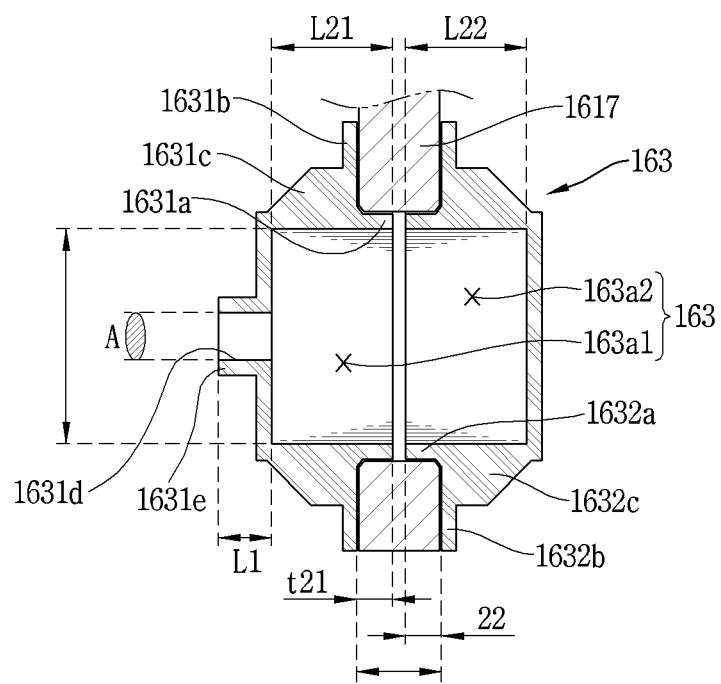
FIG. 8 is a cross-sectional view illustrating the spring cap of FIG. 7 assembled to the spring supporter.

Referring to FIGS. 6 to 7, the spring cap 163 includes the space portion 163a formed therein and the passage portion 163b formed through a surface of the spring cap 163 so as to be communicated with the space portion 163a.

The space portion 163a can have an arbitrary volume and be separated from the inner space 110a of the shell 110. For example, the space portion 163a can be formed inside a pair of caps 1631 and 1632 in which the first and second caps 1631 and 1632 each having an open side in opposite directions in the axial direction are butt-coupled to each other in the axial direction.

In some cases, the space portion 163a may not be necessarily formed by combining the first and second caps 1631 and 1632 in pair. For example, the space portion 163a can be formed inside a single hollow cap defined in a cylindrical shape by covering opposite ends of the single cap.

The passage portion 163b is a passage to communicate an inner side of the space portion 163a with an outer side of the space portion 163a. Since the passage portion 163b corresponds to a neck portion of the Helmholtz resonator, a frequency band for attenuation can be adjusted according to a length of the passage portion 163b.

The passage portion 163b can be defined in a cylindrical shape having a predetermined length. In some examples, the passage portion 163b may not extend from a side surface of the cap, but be defined in a simple hole shape penetrating the side surface of the cap forming the space portion 163a.

In addition, an inner diameter D2 of the passage portion 163b is smaller than an inner diameter D1 of the space portion 163a, and the passage portion 163b can be formed through a side surface of the spring cap 163 in the axial direction to communicate the space portion 163a with the inner space 110a of the shell 110. For example, the passage portion 163b can be formed through an axial side surface of at least one of the first and second caps 1631 and 1632 in pair described above, or can be formed through a side surface of the single hollow cap described above. In some implementations, the former in which the space portion 163a is formed by combining the first and second caps 1631 and 1632 in pair will be described as a representative example.

For example, the spring cap 163 can include the first cap 1631 coupled to the front surface of the spring support portion 1617, and the second cap 1632 coupled to the rear surface of the spring support portion 1617.

The first cap 1631 and the second cap 1632 can be respectively inserted into a front side and a rear side of the cap support hole 1617a formed at the spring support portion 1617. Accordingly, the first cap 1631 and the second cap 1632 can communicate with each other through the cap support hole 1617a to form the above-described space portion 163a.

The first cap 1631 can include a first hole insertion portion 1631a, a first cap support portion 1631b, and a first spring insertion portion 1631c. The first hole insertion portion 1631a and the first spring insertion portion 1631c form a first space portion 163a1 forming an inner space of the first cap 1631 and a substantial part of the space portion 163a.

The first hole insertion portion 1631a can be inserted into the front side of the cap support hole 1617a (hereinafter, referred to as a first side). A length of the first hole insertion portion 1631a can be shorter than an axial length t1 of the cap support hole 1617a. For example, an axial length t21 of the first hole insertion portion 1631a can be about ½ or less than the axial length t1 of the cap support hole 1617a. An axial length t22 of a second hole insertion portion 1632a to be described later can be about ½ or less than the axial length t1 of the cap support hole 1617a. Accordingly, the first hole insertion portion 1631a and the second hole insertion portion 1632a can be respectively inserted into each side of the cap support hole 1617a.

In addition, the first hole insertion portion 1631a can be defined in a cylindrical shape with open opposite ends. Accordingly, the first hole insertion portion 1631a communicates with the cap support hole 1617a and the second hole insertion portion 1632a to be described later to form a part of the space portion 163a.

The first cap support portion 1631b can extend in a flange shape from an outer circumferential surface of the first hole insertion portion 1631a. An outer diameter of the first cap support portion 1631b can be larger than an inner diameter of the cap support hole 1617a. Accordingly, the first cap support portion 1631b can be supported by the front surface of the spring support portion 1617 in the axial direction, and an end portion of the first spring 1621 can be supported by a front surface of the first cap support portion 1631b in the axial direction.

The first spring insertion portion 1631c can extend from the first cap support portion 1631b in a direction away from the first hole insertion portion 1631a. And, the first spring insertion portion 1631c can have a constant inner diameter in the axial direction. This can increase a volume of the first space portion 163a1.

In addition, an outer diameter of the first spring insertion portion 1631c can be smaller than an inner diameter of the first spring 1621, and can be reduced in a direction away from the spring supporter 1613. This can suppress interference with the first spring 1621 inserted into the first spring insertion portion 1631c.

In addition, a rear surface of the first spring insertion portion 1631c can be entirely opened to communicate with the first hole insertion portion 1631a, and a front surface of the first spring insertion portion 1631c can be partially opened. Accordingly, the first spring insertion portion 1631c can be defined in a container shape having an empty space therein to form another part of the space portion 163a together with an inner space of a second spring insertion portion 1632c to be described later.

On the other hand, most of the front surface of the first spring insertion portion 1631c is blocked, but a central portion thereof can be opened to form the passage portion 163b described above. For example, the front surface of the first spring insertion portion 1631c can be provided with a refrigerant inlet and outlet hole 1631d formed therethrough, and there can be provided a refrigerant guide protrusion 1631e extending in the axial direction from a rim of the refrigerant inlet and outlet hole 1631d.

The refrigerant inlet and outlet hole 1631d and the refrigerant guide protrusion 1631e form the passage portion 163b described above. A cross-sectional area A of the refrigerant inlet and outlet hole 1631d and an axial length L1 of the refrigerant guide protrusion 1631e can be adjusted according to a specific frequency band to be offset.

In addition, the first spring insertion portion 1631c can be defined in a container shape having an empty space therein to form another part of the space portion 163a together with the inner space of the second spring insertion portion 1632c to be described later. However, an axial front surface of the first spring insertion portion 1631c can be partially opened to form the passage portion 163b described above. The passage portion 163b can be defined in a cylindrical shape having a predetermined length in the axial direction.

In some implementations, the second cap 1632 can include a second hole insertion portion 1632a, a second cap support portion 1632b, and a second spring insertion portion 1632c. The second hole insertion portion 1632a and the second spring insertion portion 1632c form a second space portion 163a2 forming an inner space of the second cap 1632 and a substantial part of the space portion 163a.

The second hole insertion portion 1632a can be inserted into the rear side of the cap support hole 1617a (hereinafter, referred to as a second side). A length of the second hole insertion portion 1632a can be shorter than the axial length t1 of the cap support hole 1617a. For example, an axial length t22 of the second hole insertion portion 1632a can be about ½ or less than the axial length t1 of the cap support hole 1617a.

In addition, the second hole insertion portion 1632a can be defined in a cylindrical shape with open opposite ends. Accordingly, the second hole insertion portion 1632a communicates with the cap support hole 1617a and the first hole insertion portion 1631a described above to form a part of the space portion 163a.

The second cap support portion 1632b can extend in a flange shape from an outer circumferential surface of the second hole insertion portion 1632a. An outer diameter of the second cap support portion 1632b can be larger than the inner diameter of the cap support hole 1617a. Accordingly, the second cap support portion 1632b can be supported by the rear surface of the spring support portion 1617 in the axial direction, and an end portion of the second spring 1622 can be supported by a rear surface of the second cap support portion 1632b in the axial direction.

The second spring insertion portion 1632c can extend from the second cap support portion 1632b in a direction away from the second hole insertion portion 1632a. And, the second spring insertion portion 1632c can have a constant inner diameter in the axial direction. This can increase a volume of the second space portion 163a2.

In addition, an outer diameter of the second spring insertion portion 1632c can be smaller than an inner diameter of the second spring 1622, and can be reduced in a direction away from the spring supporter 1613. This can suppress interference with the second spring 1622 inserted into the second spring insertion portion 1632c.

In addition, an axial front surface of the second spring insertion portion 1632c can be opened to communicate with the second hole insertion portion 1632a, and an axial rear surface of the second spring insertion portion 1632c can be closed. Accordingly, the second spring insertion portion 1632c can be defined in a container shape having an empty space therein to form another part of the space portion 163a together with an inner space of the first spring insertion portion 1631c described above.

An effect of the spring cap described above is as follows.

When the piston 142 reciprocates together with the mover 130b in the axial direction, the spring supporter 1613 coupled to the mover 130b and the piston 142 also reciprocate in the axial direction. Here, the first springs 1621 provided on the front side of the spring supporter 1613 and the second springs 1622 provided on the rear side of the spring supporter 1613 stretch and contract in opposite directions to thereby allow the mover 130b and the piston 142 to perform a reciprocating motion while resonating.

Here, the spring supporter 1613 is provided with the first and second caps 1631 and 1632 for respectively supporting the rear end of the first spring 1621 and the front end of the second spring 1622 in the axial direction, to thereby reciprocate together with the spring supporter 1613.

And, as the spring cap 163 is provided with the space portion 163a and the passage portion 163b serving as a kind of resonator, noise transmitted to the inner space 110a of the shell 110 while the spring cap 163 reciprocates in the axial direction is canceled.

Figure 9:
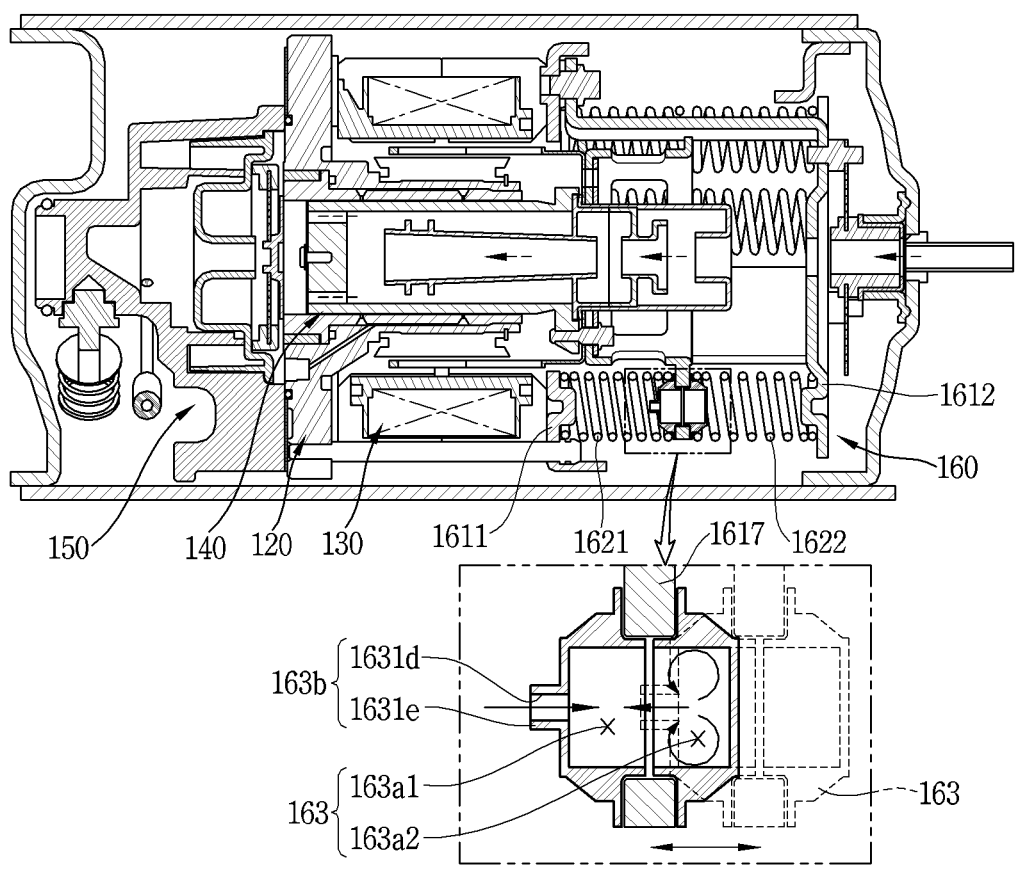
FIG. 9 is a cross-sectional view illustrating an example in which noise is attenuated using the spring cap.

FIG. 9 is a cross-sectional view illustrating a process in which noise is attenuated using a spring cap in a linear compressor.

Referring to FIG. 9, when the spring cap 163 reciprocates (or resonates) together with the mover 130b and the piston 142, refrigerant filled in the inner space 110a of the shell 110 is introduced into the space portion 163a through the passage portion 163b, and then flows into the inner space 110a of the shell 110 through the passage portion 163b. In this process, noise generated from the compressor body C and the like is canceled in the inner space 110a of the shell 110 by the Helmholtz effect by the spring cap 163.

In general, the Helmholtz resonator cancels noise in a specific frequency band, by an area and a length of the passage portion 163b corresponding to a neck portion and a volume of the space portion 163a corresponding to a volume portion. Accordingly, when an internal volume of the spring cap 163 forming the space portion 163a and the area and length of the passage portion 163b are appropriately adjusted, noise in a specific frequency band (for example, 800 Hz) can be canceled.

Figure 10:
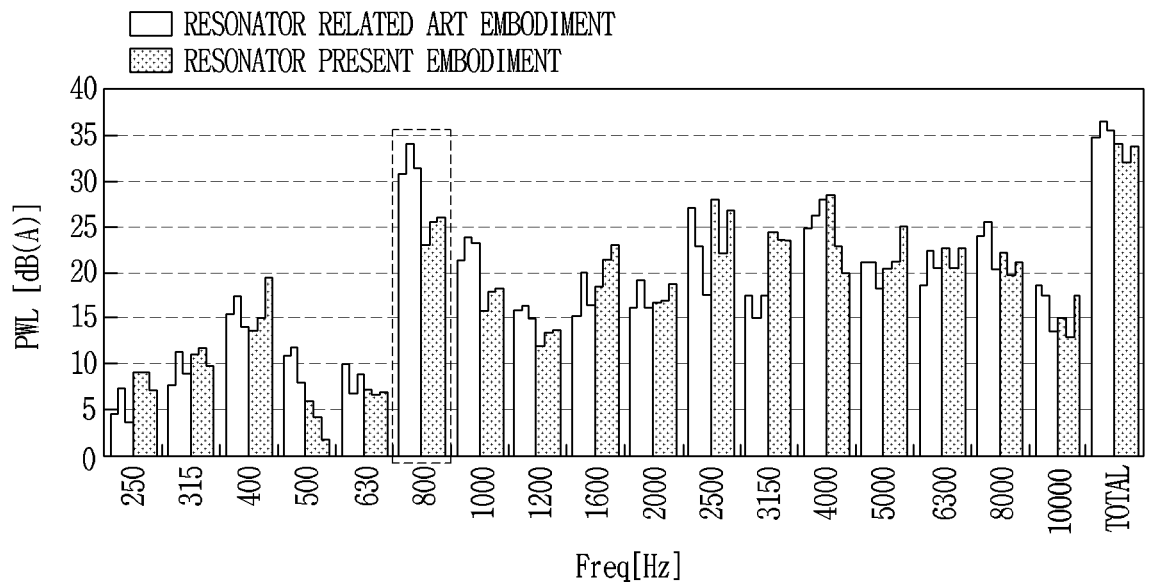
FIG. 10 is a graph showing an example of noise reducing effects using the spring cap.

FIG. 10 is a graph showing noise reducing effects using a spring cap.

Referring to FIG. 10, it can be seen that a noise attenuation effect is remarkable in the 800 Hz band. This is because, only the suction muffler 151 and the discharge cover assembly 155 were used to attenuate suction noise and discharge noise in the related art, and there remained noise in a frequency band (for example, 800 Hz) that could not be removed by these silencers. However, as a result of appropriately adjusting and applying the space portion 163a and the passage portion 163b of the spring cap 163, noise in the corresponding frequency band is attenuated as shown in the graph above.

In this way, as noise is removed by the spring cap, noise generated inside the shell can be effectively canceled.

In addition, by canceling the noise generated inside the shell without additionally installing a separate silencer, not only can the manufacturing cost of the compressor be reduced, but also the increase in a weight of the compressor can be suppressed.

In addition, an overall noise of the compressor can be significantly reduced by effectively canceling noise in various frequency bands generated inside the shell.

Hereinafter, description will be given of another example of the spring cap.

In the above-described example, the first spring insertion portion of the first cap and the second spring insertion portion of the second cap, which form a part of the space portion, are defined in shapes substantially the same, but in some cases, the first spring insertion portion 1631c and the second spring insertion portion 1632c can be defined in shapes different from each other.

Figure 11:
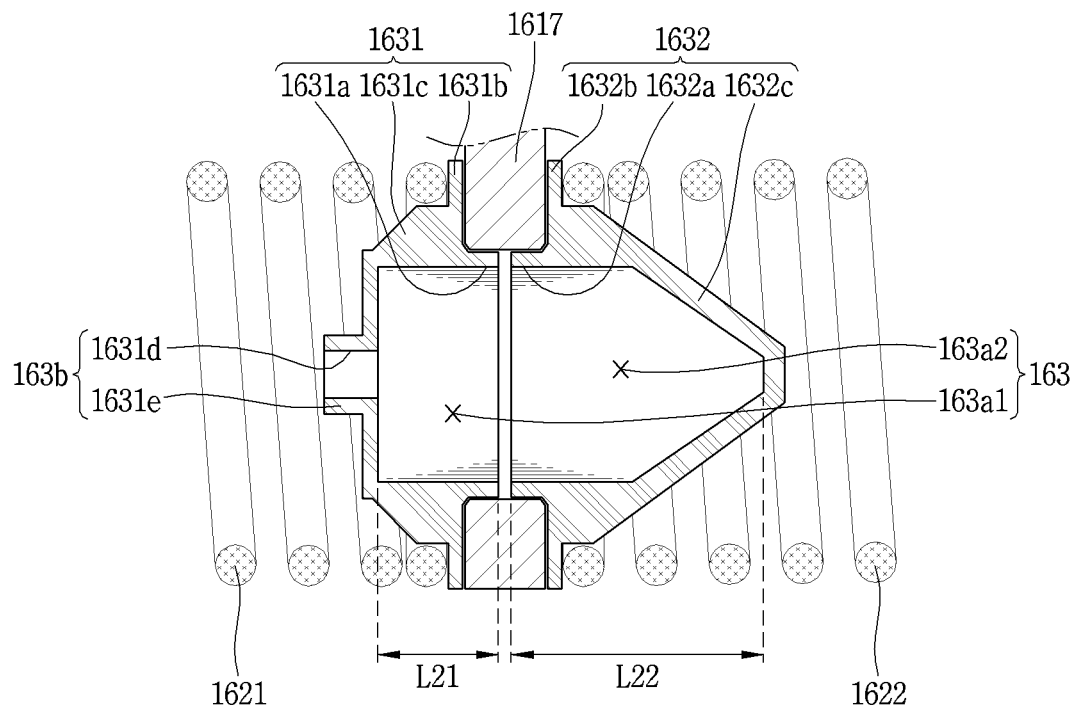
FIG. 11 is a cross-sectional view illustrating an example of a spring cap.

FIG. 11 is a cross-sectional view illustrating another example of a spring cap.

Referring to FIG. 11, a spring cap 163 can include a first cap 1631 and a second cap 1632. Since an overall configuration of the first cap 1631 and the second cap 1632 and effects thereof are substantially the same as those of the example in FIG. 7 described above, detailed descriptions thereof will be omitted.

However, in some implementations, a first spring insertion portion 1631c forming a part of the first cap 1631 and a second spring insertion portion 1632c forming a part of the second cap 1632 can be formed differently. And accordingly, noise in various frequency bands can be canceled by increasing the volume of the space portion 163a.

For example, a length of the first spring insertion portion 1631c can be limited as the first spring insertion portion 1631c is provided with the refrigerant guide protrusion 1631e described above. On the other hand, since the second spring insertion portion 1632c is formed in a closed shape, there is a margin to extend in the axial direction.

Accordingly, an axial length L22 of the second spring insertion portion 1632c can be longer than an axial length L21 of the first spring insertion portion 1631c. However, when the axial length L22 of the second spring insertion portion 1632c increases, an outer circumferential surface of the second spring insertion portion 1632c interferes with an inner circumferential surface of the second spring 1622 to cause a friction. Due to this reason, the second spring insertion portion 1632c can be formed in a tapered shape such that a cross-sectional area of the second spring insertion portion 1632c gradually decreases in a direction away from the spring support portion 1617.

Of course, when a side surface of the first spring insertion portion 1631c is blocked and a side surface of the second spring insertion portion 1632c is provided with a refrigerant inlet and outlet hole and a refrigerant guide protrusion formed therethrough, the length of the first spring insertion portion 1631c can be longer than the length of the second spring insertion portion 1632c. Description thereof will be replaced by the example described above.

When the axial length L21 of the first spring insertion portion 1631c and the axial length L22 of the second spring insertion portion 1632c are formed differently as described above, the volume of the space portion 163a can be changed in various ways when needed. Accordingly, noise in various frequency bands can be canceled by using a same number of spring caps 163.

Hereinafter, description will be given of another example of the spring cap.

In the above-described example, only the first cap is provided with the passage portion, but in some cases, the first cap 1631 and the second cap 1632 each can be provided with passage portions 163b1 and 163b2, respectively.

Figure 12A:
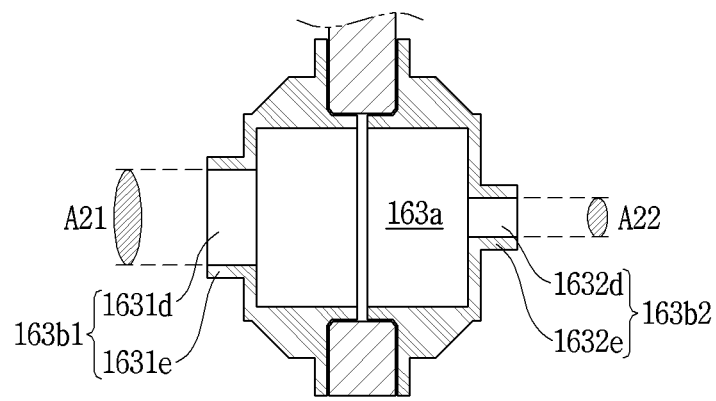
FIGS. 12A to 12C are cross-sectional views each illustrating an example of a spring cap.
Figure 12B:
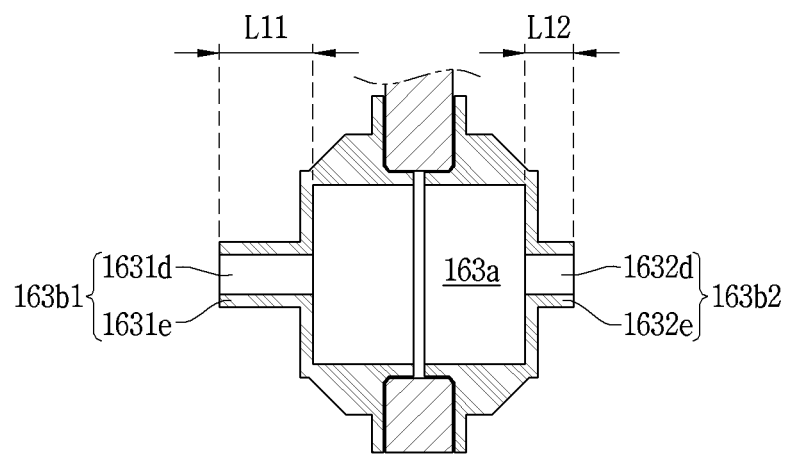
Figure 12C:
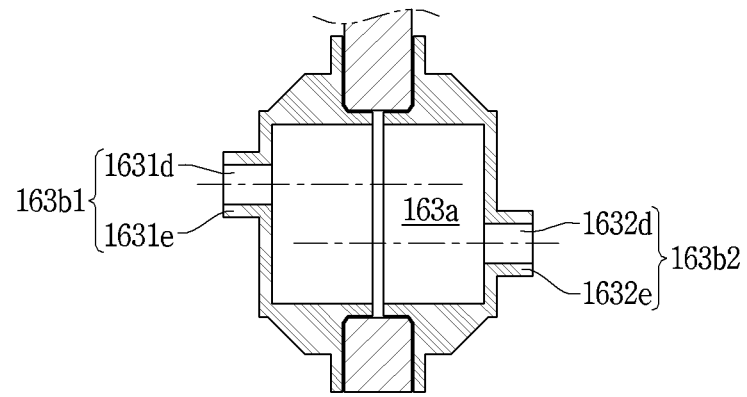

FIGS. 12A to 12C are cross-sectional views each illustrating still another example of a spring cap.

Referring to FIGS. 12A to 12C, a spring cap can include a first cap 1631 and a second cap 1632. Since an overall configuration of the first cap 1631 and the second cap 1632 and effects thereof are substantially the same as those of the example of FIG. 8 described above, detailed descriptions thereof will be omitted.

However, in some implementations, the first cap 1631 can be provided with a first passage portion 163b1, and the second cap 1632 can be provided with a second passage portion 163b2. For example, the first spring insertion portion 1631c can be provided with the first passage portion 163b1, and the second spring insertion portion 1632c can be provided with the second passage portion 163b2. Specifically, a front surface of the first spring insertion portion 1631c can be provided with the first passage portion 163b1 including a first refrigerant inlet and outlet hole 1631d and a first refrigerant guide protrusion 1631e, and a rear surface of the second spring insertion portion 1632c can be provided with the second passage portion 163b2 including a second refrigerant inlet and outlet hole 1632d and a second refrigerant guide protrusion 1632e.

Here, as illustrated in FIG. 12A, a cross-sectional area A21 of the first refrigerant inlet and outlet hole 1631d can be larger than a cross-sectional area A22 of the second refrigerant inlet and outlet hole 1632d. However, the cross-sectional area A21 of the first refrigerant inlet and outlet hole 1631d can be smaller than the cross-sectional area A22 of the second refrigerant inlet and outlet hole 1632d, or the cross-sectional area A21 of the first refrigerant inlet and outlet hole 1631d can be equal to the cross-sectional area A22 of the second refrigerant inlet and outlet hole 1632d.

In addition, as illustrated in FIG. 12B, an axial length L11 of the first refrigerant guide protrusion 1631e can be longer than an axial length L12 of the second refrigerant guide protrusion 1632e. However, the axial length L11 of the first refrigerant guide protrusion 1631e can be shorter than the axial length L12 of the second refrigerant guide protrusion 1632e, or the axial length L11 of the first refrigerant guide protrusion 1631e can be equal to the axial length L12 of the second refrigerant guide protrusion 1632e.

When the first passage portion 163b1 and the second passage portion 163b2 are respectively provided at axial opposite sides of the space portion 163a as described above, refrigerant can flow into and out of the space portion 163a through the first passage portion 163b1 or through the second passage portion 163b2 while the spring cap 163 reciprocates in the axial direction.

However, in these cases, the refrigerant quickly passes through the space portion 163a through opposite passage portions 1631b1 and 1632b2, thereby weakening noise reducing effects. In this regard, as illustrated in FIG. 12C, the first passage portion 163b1 and the second passage portion 163b2 can lie on different axial lines. As a result, the refrigerant flowing into the space portion 163a through the first passage portion 163b1 can be suppressed from directly flowing out to the second passage portion 163b2, thereby enhancing noise reducing effects.

Hereinafter, description will be given of another example of the spring cap.

In the above-described example, all spring caps arranged in the circumferential direction are defined in shapes (i.e., standards) identical to each other, but in some cases, the spring caps can be defined in shapes different from each other.

Figure 13A:
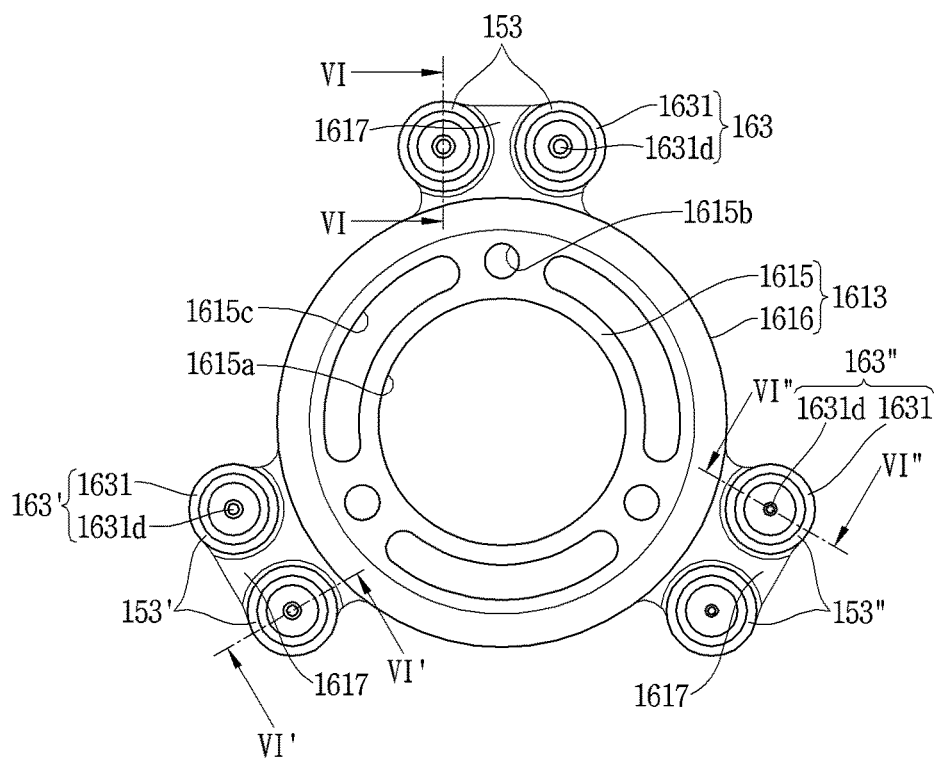
FIG. 13A illustrates a planar view of an example of a spring supporter equipped with spring caps having different shapes or sizes.
Figure 13B:
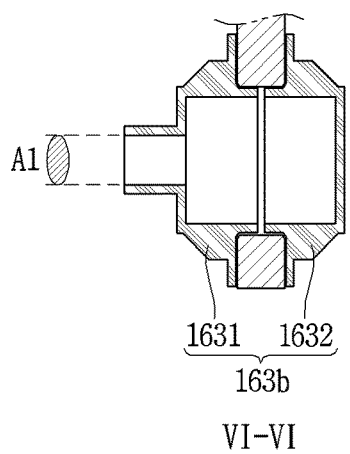
FIGS. 13B to 13D are cross-sectional views taken along lines VI-VI, VI'-VI', and VI"-VI" in FIG. 13A, illustrating each of the spring caps.
Figure 13C:
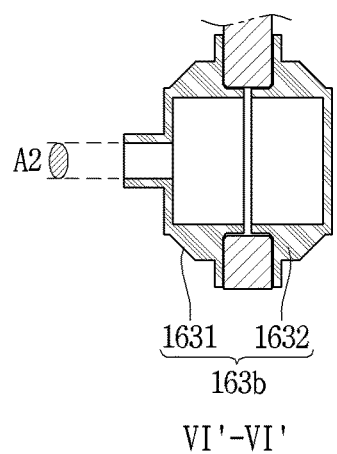
Figure 13D:
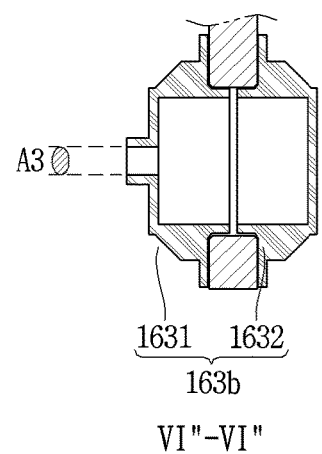

FIG. 13A illustrates a planar view of a spring supporter equipped with spring caps of different standards, FIGS. 13B to 13D cross-sectional views taken along lines VI-VI, VI'-VI', and VI"-VI" in FIG. 13A, illustrating each of the spring caps.

Referring to FIGS. 13A to 13D, a spring cap can include a first cap 1631 and a second cap 1632. Since an overall configuration and effects of the first cap 1631 and the second cap 1632 are substantially the same as those of the example in FIG. 8 described above, detailed descriptions thereof will be omitted.

However, in some implementations, shapes of spring caps 163 adjacent to each other in the circumferential direction can be different. For example, when six spring caps 163 are provided in the circumferential direction, the six spring caps 163 can be divided into six groups of spring caps 163 each of which defined in different shapes, or can be divided into three groups of spring caps 163, 163', and 163" each of which including two spring caps and defined in different shapes.

Here, a first group of spring caps 163 can have a noise reducing characteristic of a first frequency band, and a second group of spring caps 163' can have a noise reducing characteristic of a second frequency band. In addition, a third group of spring caps 163" can have a noise reducing characteristic of a third frequency band.

Here, each group of spring caps 163, 163', and 163" can have noise reducing characteristics of different frequency bands by adjusting the volume of the space portion 163a, and cross-sectional areas A1, A2, and A3 and lengths of the passage portions 163b. For example, the examples of FIGS. 11 to 12C can be applied.

When each group of spring caps 163, 163', and 163" has a shape different from each other as described above, noise in various frequency bands generated while the compressor operates can be appropriately canceled. And accordingly, the noise in various frequency bands generated inside the shell can be evenly cancelled to thereby reduce noise of the compressor.

Hereinafter, description will be given of another example of the spring cap.

In the above-described example, the spring cap includes the first cap and the second cap, and the first cap and the second cap are respectively inserted into opposite sides of the spring support portion. However, in some cases, the first cap or the second cap can pass through the spring support portion from one side to another side thereof to be coupled thereto.

Figure 14:
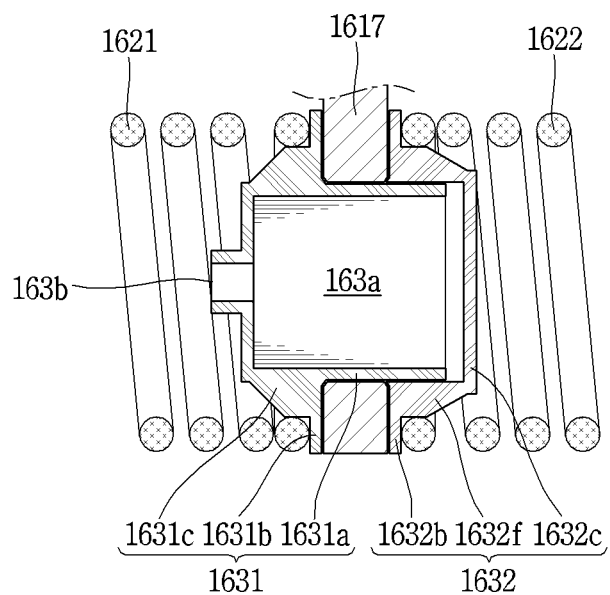
FIG. 14 is a cross-sectional view illustrating an example of a spring cap.

FIG. 14 is a cross-sectional view illustrating still another example of a spring cap.

Referring to FIG. 14, a spring cap 163 can be defined in a long hollow cylindrical shape to form a space portion 163a therein.

For example, one end of a first cap 1631 is provided with a hole penetrating portion 1631a passing through a cap support hole 1617a of a spring support portion 1617, and another end of the first cap 1631 is provided with a first spring insertion portion 1631c onto which a first spring 1621 is inserted. In addition, a middle portion of the first cap 1631 can be provided with a first cap support portion 1631b axially supported by a front surface of the spring support portion 1617.

One end of a second cap 1632 can be provided with a cap coupling portion 1632f that receives the hole penetrating portion 1631a of the first cap 1631, and another end of the second cap 1632 can be provided with the second spring insertion portion 1632c inserted into a second spring 1622. In addition, an outer circumferential surface of the cap coupling portion 1632f can be provided with a second cap support portion 1632b extending therefrom in a flange shape so as to be supported by a rear surface of the spring support portion 1617 in the axial direction.

At least one of a front surface of the first spring insertion portion 1631c and a rear surface of the second spring insertion portion 1632c can be provided with the passage portion 163b described above formed therethrough. Since the passage portion 163b is the same as the above-described examples, a detailed description thereof will be omitted.

As described above, when the first cap 1631 or the second cap 1632 passes through the cap support hole 1617a to be supported by the spring support portion 1617, the first cap 1631 or the second cap 1632 can be suppressed from being separated from the spring support portions 1617. This can facilitate an assembly process compared to a case where the first cap 1631 or the second cap 1632 is inserted halfway into the cap support hole 1617a.

Hereinafter, description will be given of another example of the spring cap.

In the above-described example, the stator cover and the rear cover are respectively provided with the spring fixing protrusion formed of a sheet metal, but in some cases, the stator cover and the rear cove can be provided with the spring cap coupled thereto.

Figure 15:
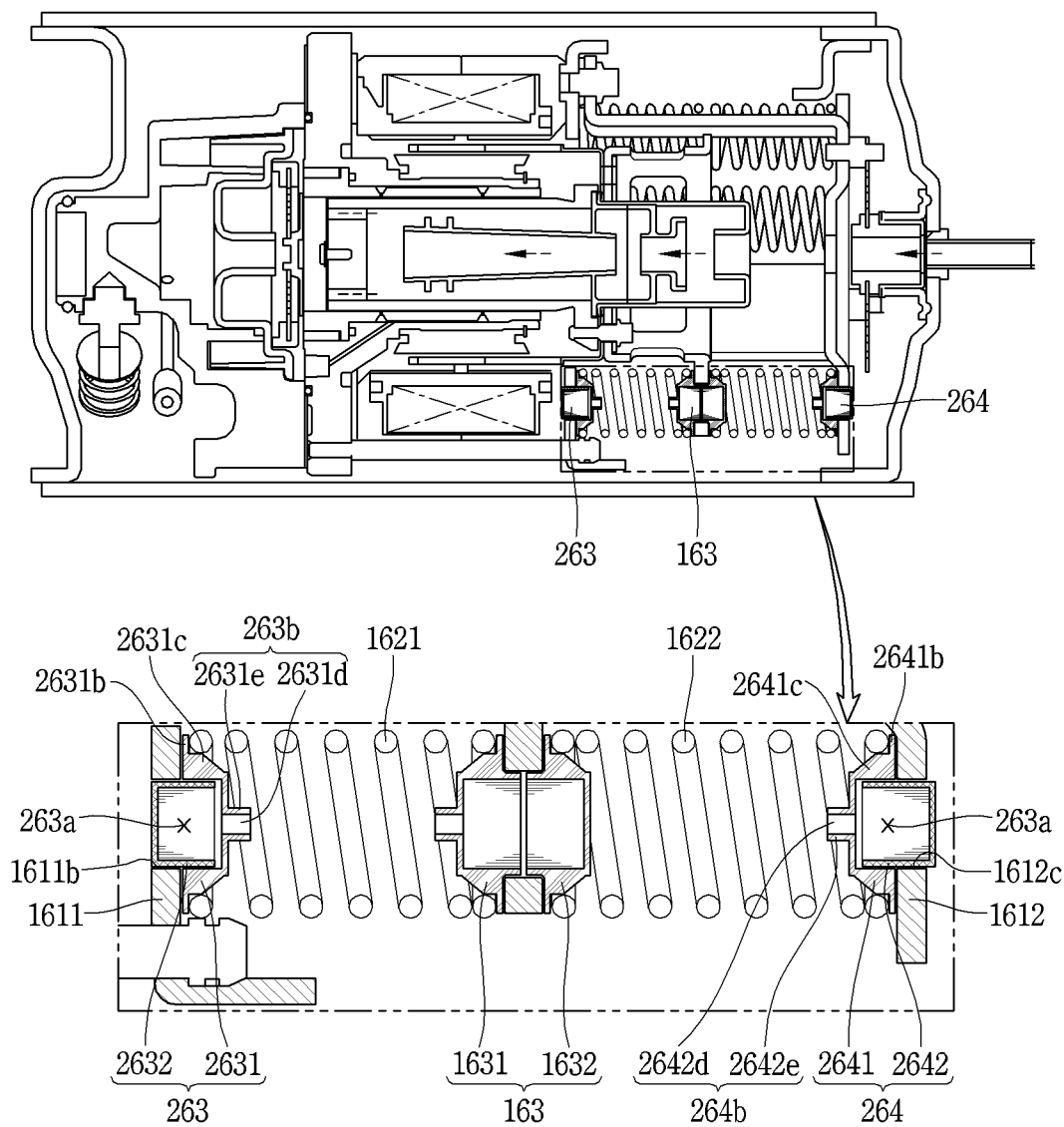
FIG. 15 is a cross-sectional view illustrating an example of installation positions of spring caps.

FIG. 15 is a cross-sectional view illustrating another example of an installation position of a spring cap.

Referring to FIG. 15, a stator cover 1611 and a rear cover 1612 each can be provided with cap support holes 1611b and 1612c, respectively, and spring caps 263 and 264 each can be inserted into the cap support hole 1611b of the stator cover 1611 and the cap support hole 1612c of the rear cover 1612, respectively.

The spring cap 263 can include a first cap 2631 and a second cap 2632, and the spring cap 264 can include a first cap 2641 and a second cap 2642. The first caps 2631 and 2641, and the second caps 2632 and 2642 can be defined in the shapes of the example in FIG. 8, or can be defined in other shapes described above. However, in the spring caps 263 and 264, springs 1621 and 1622 each can be coupled to only one side of the spring caps 263 and 264, respectively, and therefore, either the first caps 2631 and 2661 or the second caps 2262 and 2642 can be provided with spring insertion portions.

For example, the first caps 2631 and 2641 can be provided with spring insertion portions 2631c and 2641c that are inserted onto end portions of hole insertion portions 2632a and 2642a to be described later, respectively. And, outer circumferential surfaces of the spring insertion portions 2631c and 2641c each can be provided with cap support portions 2631b and 2641b defined in a flange shape, respectively, so as to be supported by a side surface of the stator cover 1611 or a side surface of the rear cover 1612.

In addition, side surfaces of the spring insertion portions 2631c and 2661c each can be provided with a refrigerant inlet and outlet holes 2631d and 2641d respectively formed therethrough in the axial direction, and refrigerant guide protrusions 2631e and 2641e each can extend in the axial direction from outer circumferential surfaces of the refrigerant inlet and outlet holes 2631d and 2641d, respectively. Accordingly, the refrigerant inlet and outlet holes 2631d and 2641d and the refrigerant guide protrusions 2631e and 2641e can compose passage portions 263b and 264b.

The second caps 2632 and 2642 can have hole insertion portions 2632a and 2642a that are inserted through the cap support holes 1611b and 1612c. The hole insertion portions 2632a and 2642a each can be defined in a cylindrical shape, wherein surfaces of the hole insertion portions 2632a and 2642a facing the first caps 2631 and 2641 are opened and opposite surfaces thereof are closed. Accordingly, inner spaces formed by the hole insertion portions 2632a and 2642a of the second caps 2262 and 2642 correspond to space portions 263a and 264a.

When a spring cap having a function of a silencer is installed on at least one of the stator cover and the rear cover as described above, the number of Helmholtz resonators can be increased. Accordingly, noise generated during an operation of the compressor can be canceled.

Further, even in this case, when the shapes of the first caps 2631 and 2661 and the second caps 2262 and 2642 are different, noise in various frequency bands can be canceled.

Hereinafter, description will be given of another example of the spring cap.

In the above-described example, the spring cap is inserted into the spring support portion, but in some cases, the spring cap can be coupled between the springs.

Figure 16:
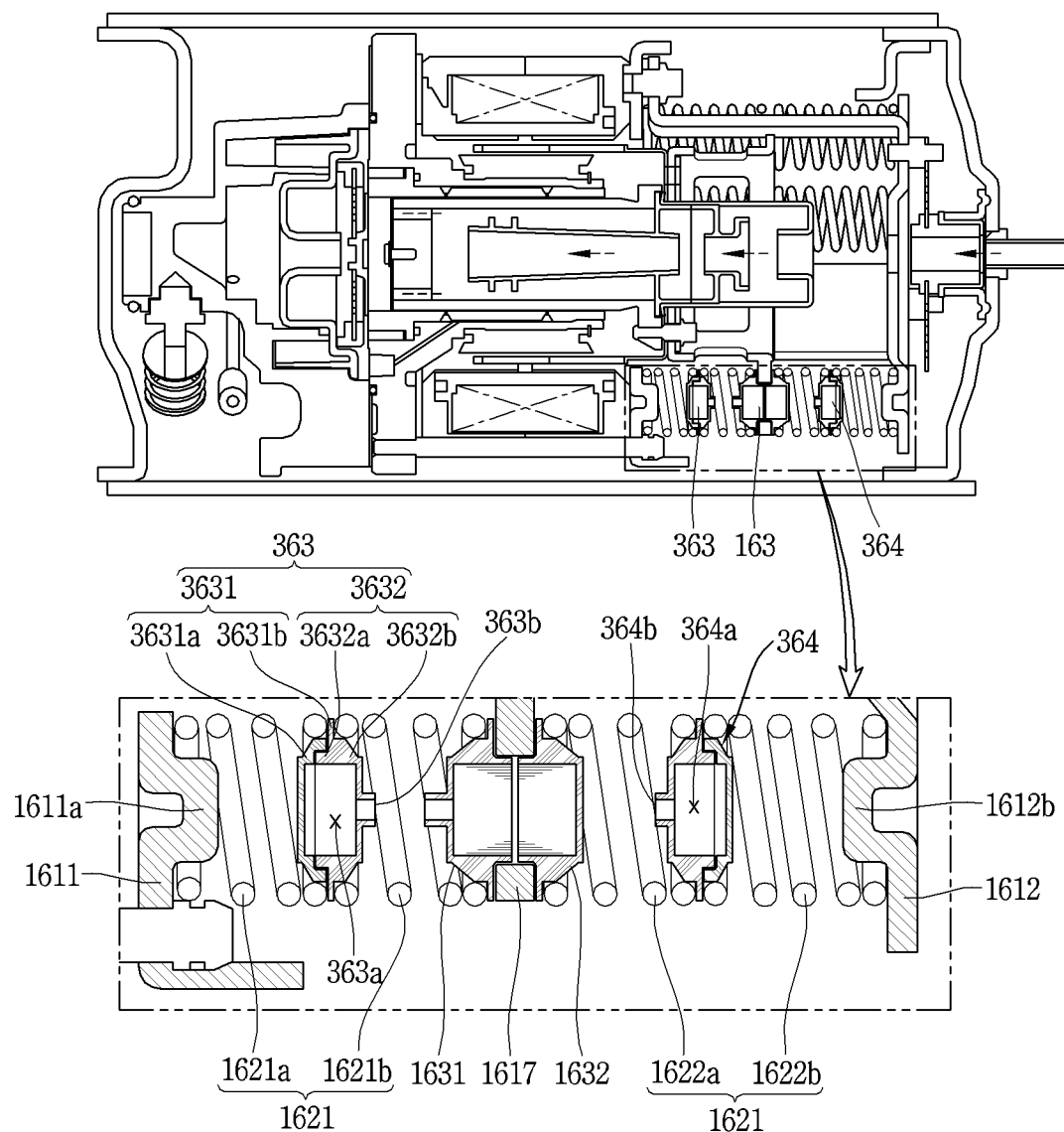
FIG. 16 is a cross-sectional view illustrating an example of installation positions of spring caps.

FIG. 16 is a cross-sectional view illustrating still another example of an installation position of a spring cap.

Referring to FIG. 16, a spring 162 includes a first spring 1621 disposed at a front side and a second spring 1622 disposed at a rear side with the spring support portion 1617 interposed therebetween.

The first spring 1621 and the second spring 1622 each can be divided into a plurality of springs. For example, the first spring 1621 can include a front first spring 1621a and a rear first spring 1621b, and the second spring 1622 can include a front second spring 1622a and a rear second spring 1622b. Accordingly, the spring 162 can be arranged such that the front first spring 1621a, the rear first spring 1621b, the front second spring 1622a, and the rear second spring 1622b are sequentially arranged in the axial direction from the stator cover 1611 toward the rear cover 1612.

A front end of the front first spring 1621a can be fixedly inserted onto the first spring support protrusion 1611a of the stator cover 1611, and a rear end of the rear first spring 1621b can be fixedly inserted onto the first cap 1631 of the spring support portion 1617.

In addition, a front end of the front second spring 1622a can be fixedly inserted onto the second cap 1632 of the spring support portion 1617, and a rear end of the rear second spring 1622b can be fixedly inserted onto the second spring support protrusion 1612b of the rear cover 1612.

Here, the first cap 1631 and the second cap 1632 can compose a spring cap having a space portion 163a and a passage portion 163b as in the above-described examples, or a simple spring cap with open opposite ends.

However, in some implementations, a first spring cap 363 can be provided between the front first spring 1621a and the rear first spring 1621b to connect between the front first spring 1621a and the rear first spring 1621b, and a second spring cap 364 can be provided between the front second spring 1622a and the rear second spring 1622b to connect between the front second spring 1622a and the rear second spring 1622b.

The first spring cap and the second spring cap can be formed as a single body, or can include a plurality of caps as in the above-described examples. FIG. 15 illustrates an example of a plurality of caps.

For example, the first spring cap 363 can include a front first cap 3631 and a rear first cap 3632.

One end of the front first cap 3631 can have a front first spring insertion portion 3631a onto which the front first spring 1621a is inserted, and another end of the front first cap 3631 can have a cap flange portion 3631b extending in a flange shape to support each of the front first spring 1621a and the rear first spring 1621b in axial opposite directions.

One end of the rear first cap 3632 can have a cap coupling portion 3632a inserted into the front first cap 3631, and another end of the rear first cap 3632 can have a rear first spring insertion portion 3632b onto which the rear first spring 1621b is inserted.

Here, the front first cap 3631 and the rear first cap 3632 can have a first space portion 363a formed therein, and at least one of the front first cap 3631 and the rear first cap 3632 can be provided with a first passage portion 363b.

The second spring cap 364 can be identical to the first spring cap 363 described above. And, the first spring cap 363 and the second spring cap 364 can be installed symmetrically with the spring support portion 1617 interposed therebetween. Therefore, a detailed description thereof will be omitted.

As described above, when the first spring cap 363 is installed at a middle portion of the first spring 1621 and the second spring cap 364 is installed at a middle portion of the second spring 1622, this can reduce lateral deformation of the first spring 1621 and the second spring 1622 to thereby suppress sagging of lateral middle portions of the first spring 1621 and the second spring 1622. This can increase concentricity of the piston 142 to thereby reduce friction loss between the piston 142 and the cylinder 141.

Also, in this case, as the first spring cap 363 forms a space portion 363a and a passage portion 363b, and the second spring cap 364 forms a space portion 364a and a passage portion 364b, the number of Helmholtz resonators can be increased. Accordingly, noise generated during an operation of the compressor can be canceled.

Further, even in this case, when the shapes of the first spring cap 363 and the second spring cap 364 are different, noise in various frequency bands can be canceled.

Although the foregoing description has been given with reference to the examples, it will be understood that those skilled in the art will be able to variously modify and change the present disclosure without departing from the scope of the disclosure described in the claims below.

What is claimed is:

1. A linear compressor, comprising:
   a shell that defines an inner space therein;
   a motor disposed in the inner space of the shell, the motor comprising a mover configured to perform a reciprocating motion in an axial direction;
   a cylinder disposed in the inner space of the shell; a piston coupled to the mover of the motor and configured to reciprocate in the cylinder;
   a spring that supports the piston in the axial direction;
   a spring supporter coupled to the piston or the mover of the motor, the spring supporter defining a cap support hole; and
   a spring cap that is inserted into the cap support hole and supports an end portion of the spring,
   wherein the spring cap defines:
      a space portion that is defined inside the spring cap and has an interior volume, and
      a passage portion that extends through a first axial side surface of the spring cap and is configured to provide communication between the space portion and the inner space of the shell,
   wherein the spring cap comprises:
      a first cap inserted into a first side of the cap support hole, and
      a second cap inserted into a second side of the cap support hole opposite to the first side in the axial direction, and
   wherein the first cap and the second cap are in communication with each other through the cap support hole and define the space portion inside the first cap and the second cap.

2. The linear compressor of claim 1,
   wherein an axial length of the space portion is greater than an axial length of the cap support hole of the spring supporter.

3. The linear compressor of claim 1, wherein the space portion comprises a first space portion and a second space portion and the interior volume comprises a first volume and a second volume, wherein the first cap defines the first space portion having the first volume, wherein the second cap defines the second space portion having the second volume, and wherein the first volume of the first space portion is equal to the second volume of the second space portion.

4. The linear compressor of claim 1, wherein the space portion comprises a first space portion and a second space portion and the interior volume comprises a first volume and a second volume, wherein the first cap defines the first space portion having the first volume, wherein the second cap defines the second space portion having the second volume, and wherein the first volume of the first space portion is different from the second volume of the second space portion.

5. The linear compressor of claim 1, wherein one of the first cap or the second cap has a second axial side surface that is blocked, and another of the first cap or the second cap has the first axial side surface that is at least partially opened and defines the passage portion.

6. The linear compressor of claim 1, wherein the passage portion comprises a first passage portion defined at the first axial side surface of the first cap, and a second passage portion defined at one second surface of the second cap.

7. The linear compressor of claim 1, wherein the passage portion comprises:

a first passage portion defined at the first; and a second passage portion defined at the second, and wherein a cross-sectional area of the first passage portion is different from a cross-sectional area of the second passage portion, or an axial length of the first passage portion is different from an axial length of the second passage portion.

8. The linear compressor of claim 1, wherein the passage portion comprises:

a first passage portion that is defined at the first cap and extends along a first axial line; and a second passage portion that is defined at the second cap, the second passage portion extending along a second axial line different from the first axial line.

9. The linear compressor of claim 1, wherein the passage portion extends from the first axial side surface of the spring cap in the axial direction.

10. The linear compressor of claim 1, further comprising one or more additional spring caps, wherein the one or more additional spring caps are arranged in a circumferential direction, and wherein each of the additional spring caps defines an additional space portion and an additional passage portion.

11. The linear compressor of claim 10, wherein shapes of the additional space portions are identical to one another, and wherein shapes of the additional passage portions are identical to one another.

12. The linear compressor of claim 10, wherein a shape of at least one of the additional space portions is different from a shape of another of the additional space portions, and wherein a shape of at least one of the additional passage portions is different from a shape of another of the additional passage portions.

13. The linear compressor of claim 1, wherein the first cap comprises:

a first hole insertion portion inserted from a first side surface of the spring supporter into the first side of the cap support hole, a first cap support portion that has a first flange shape extending from an outer circumferential surface of the first hole insertion portion, the first cap support portion being supported by the first side surface of the spring supporter in the axial direction, and a first spring insertion portion that extends from the first cap support portion away from the first hole insertion portion, wherein the second cap comprises:

a second hole insertion portion inserted from a second side surface of the spring supporter into the second side of the cap support hole, a second cap support portion that has a second flange shape extending from an outer circumferential surface of the second hole insertion portion, the second cap support portion being supported by the second side surface of the spring supporter in the axial direction, and a second spring insertion portion that extends from the second cap support portion away from the second hole insertion portion, wherein an end portion of the first hole insertion portion faces and is in communication with an end portion of the second hole insertion portion to thereby define the space portion inside the first cap and the second cap, and wherein the axial side surface is disposed at the first spring insertion portion or the second spring insertion portion.

14. The linear compressor of claim 1, wherein the first cap comprises:

a hole penetrating portion inserted from a first side surface of the spring supporter into the cap support hole, a first cap support portion that has a first flange shape extending from an outer circumferential surface of the hole penetrating portion, the first cap support portion being supported by the first side surface of the spring supporter in the axial direction, and a first spring insertion portion that extends from the first cap support portion away from the hole penetrating portion, and wherein the second cap comprises:

a second cap support portion that has a second flange shape, the second cap support portion being supported by a second side surface of the spring supporter in the axial direction, and a second spring insertion portion that extends away from the first spring insertion portion.

15. The linear compressor of claim 1, wherein the spring cap passes through opposite axial side surfaces of the spring supporter and is coupled to the spring supporter.

16. The linear compressor of claim 1, wherein the first cap comprises a first spring insertion portion that extends in the axial direction, wherein the second cap comprises a second spring insertion portion that extends in the axial direction, and wherein a cross-sectional area of at least one of the first spring insertion portion or the second spring insertion portion reduces as the at least one of the first spring insertion portion or the second spring insertion portion extends away from the spring supporter along the axial direction.

17. The linear compressor of claim 1,
wherein the cap comprises a first spring insertion portion that extends in the axial direction,
wherein the second cap comprises a second spring insertion portion that extends in the axial direction, and
wherein an inner diameter of at least one of the first spring insertion portion or the second spring insertion portion is constant along the axial direction.

18. The linear compressor of claim 1, further comprising:
a stator cover and a rear cover that are disposed at one side of the motor, wherein one of the stator cover or the rear cover supports an end of the spring; and
an additional spring cap that is disposed at the one of the stator cover or the rear cover.

19. The linear compressor of claim 1, wherein the spring is a front spring and wherein the linear compressor further comprises a rear spring,
wherein the front spring and the rear spring are arranged along the axial direction, and
wherein the spring cap is disposed between the front spring and the rear spring and connects the front spring and the rear spring to each other.

* * * * *